(12) United States Patent
Lundquist et al.

(10) Patent No.: US 8,887,924 B2
(45) Date of Patent: Nov. 18, 2014

(54) FIELD WATER PURIFICATION SYSTEM

(71) Applicants: Trygrve J. Lundquist, San Luis Obispo, CA (US); Patricia M. Compas-Markman, San Luis Obispo, CA (US)

(72) Inventors: Trygrve J. Lundquist, San Luis Obispo, CA (US); Patricia M. Compas-Markman, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 46 days.

(21) Appl. No.: 13/652,929

(22) Filed: Oct. 16, 2012

(65) Prior Publication Data

US 2013/0048555 A1 Feb. 28, 2013

Related U.S. Application Data

(63) Continuation of application No. 12/418,598, filed on Apr. 5, 2009, now Pat. No. 8,287,729, which is a continuation-in-part of application No. 12/111,130, filed on Apr. 28, 2008, now Pat. No. 7,514,006.

(51) Int. Cl.
| | |
|---|---|
| *B01D 24/38* | (2006.01) |
| *B01D 29/88* | (2006.01) |
| *B67D 7/84* | (2010.01) |
| *A47J 36/08* | (2006.01) |
| *C02F 1/00* | (2006.01) |
| *C02F 1/72* | (2006.01) |
| *C02F 1/52* | (2006.01) |
| *C02F 1/32* | (2006.01) |
| *C02F 1/28* | (2006.01) |
| *A45F 3/16* | (2006.01) |

(52) U.S. Cl.
CPC .............. *A47J 36/08* (2013.01); *C02F 2209/11* (2013.01); *C02F 1/72* (2013.01); *C02F 1/52* (2013.01); *C02F 1/32* (2013.01); *C02F 2307/02* (2013.01); *C02F 2303/04* (2013.01); *C02F 1/002* (2013.01); *C02F 1/283* (2013.01); *C02F 1/5281* (2013.01); *A45F 3/16* (2013.01)
USPC ........ 210/466; 210/207; 210/257.1; 210/407; 210/470; 222/175

(58) Field of Classification Search
USPC ......... 383/113, 109, 108, 107; 220/4.14, 476, 220/626, 661, 665; 210/466, 207, 760, 210/257.1, 407, 470; 222/175
See application file for complete search history.

(56) References Cited

U.S. PATENT DOCUMENTS

| | | | | | |
|---|---|---|---|---|---|
| 4,490,259 | A | * | 12/1984 | Coffing | 210/704 |
| 4,816,149 | A | * | 3/1989 | Wekell | 210/257.2 |

(Continued)

FOREIGN PATENT DOCUMENTS

JP 2003212246 A * 7/2003 ............. B65D 30/16

OTHER PUBLICATIONS

Ueda, Abstract of "JP 2003-212246 A" provided by Derwent and the English machine translation of the reference.*

*Primary Examiner* — Nam Nguyen
*Assistant Examiner* — Nader Hossaini
(74) *Attorney, Agent, or Firm* — Martine Penilla Group, LLP

(57) ABSTRACT

A field water purification system is described. The field water purification system includes a container and a filter coupled to an outlet port of the container. The container includes a first layer and a second layer of polymeric material. A first edge of the first layer is bonded to a first edge of the second layer. A second edge of the first layer is bonded to a second edge of the second layer. A first end of the first layer is bonded to a first end of the second layer. The outlet port is disposed in the first layer at a first distance from the first end. A flat water filter is also described. A method for treating water is also described.

18 Claims, 22 Drawing Sheets

(56) References Cited

U.S. PATENT DOCUMENTS

| | | | |
|---|---|---|---|
| 4,828,694 A * | 5/1989 | Leason | 210/167.08 |
| 4,937,005 A * | 6/1990 | Shelstad | 210/785 |
| 4,968,437 A * | 11/1990 | Noll et al. | 210/748.1 |
| 6,293,692 B1 * | 9/2001 | Bowsher et al. | 366/130 |
| 7,044,343 B2 * | 5/2006 | Anue | 224/148.5 |
| 7,073,688 B2 * | 7/2006 | Choi et al. | 222/175 |
| 2002/0179647 A1 * | 12/2002 | Hall et al. | 222/175 |
| 2005/0045566 A1 * | 3/2005 | Larkin et al. | 210/767 |
| 2007/0199914 A1 * | 8/2007 | Hung | 215/311 |

\* cited by examiner

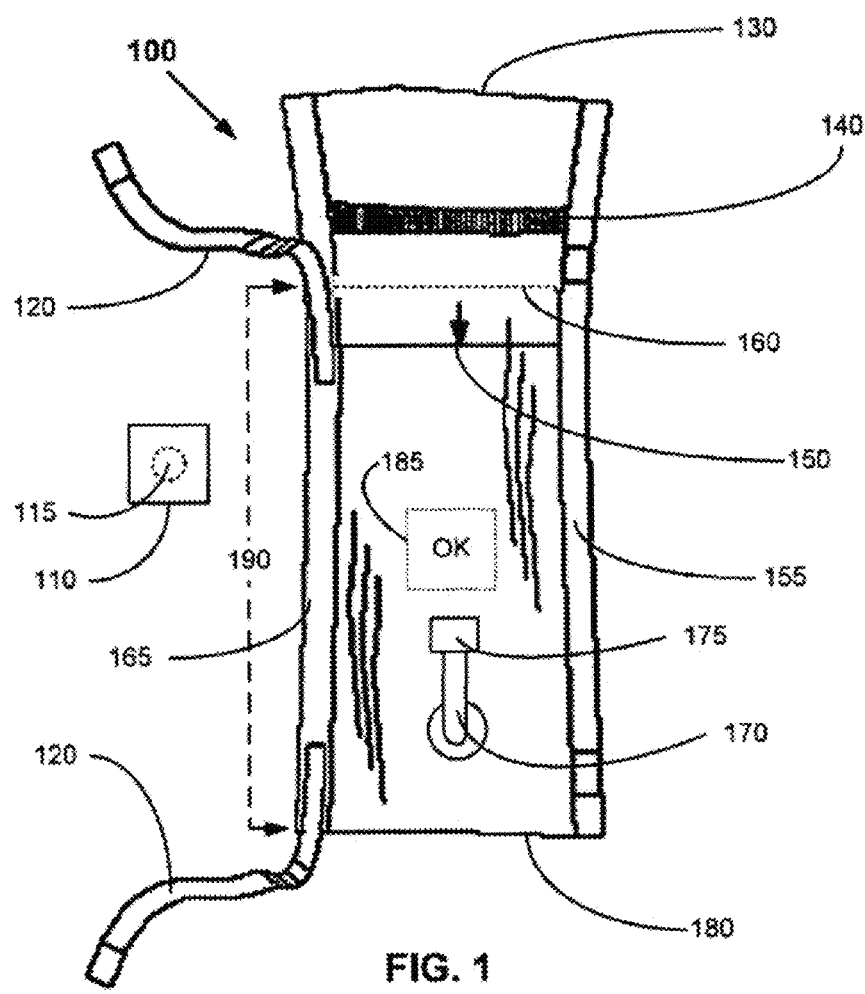
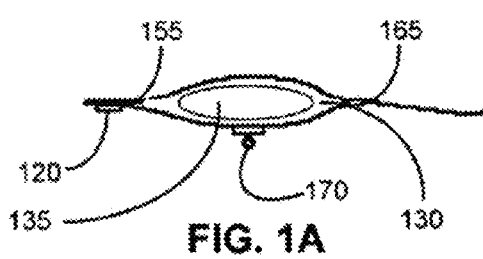
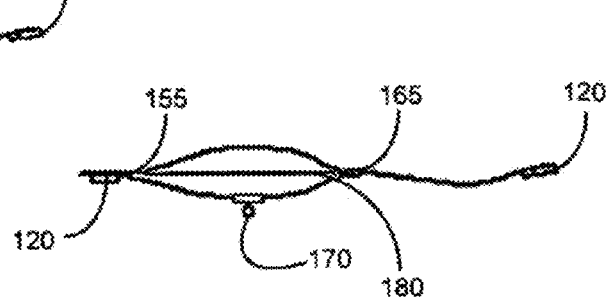

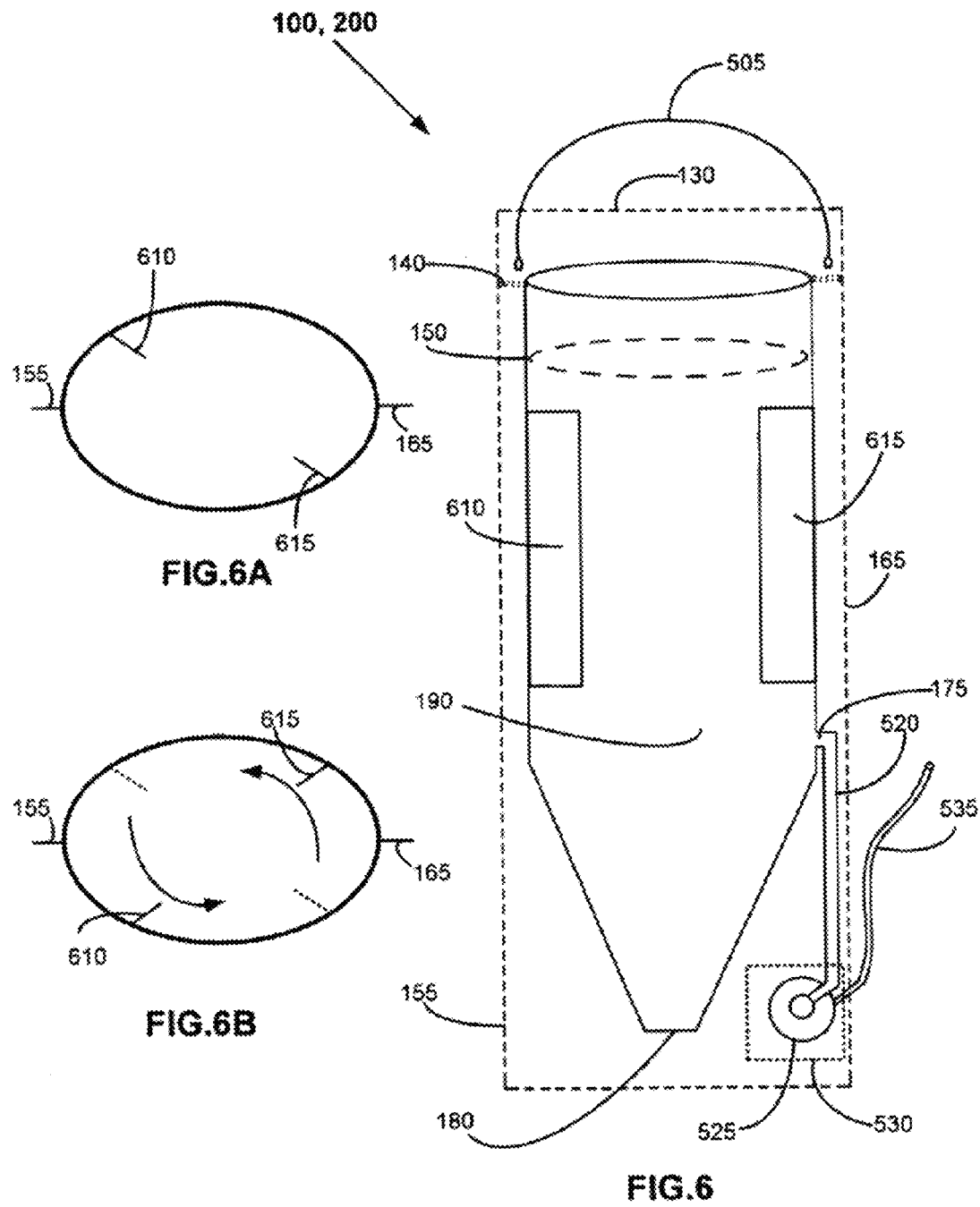

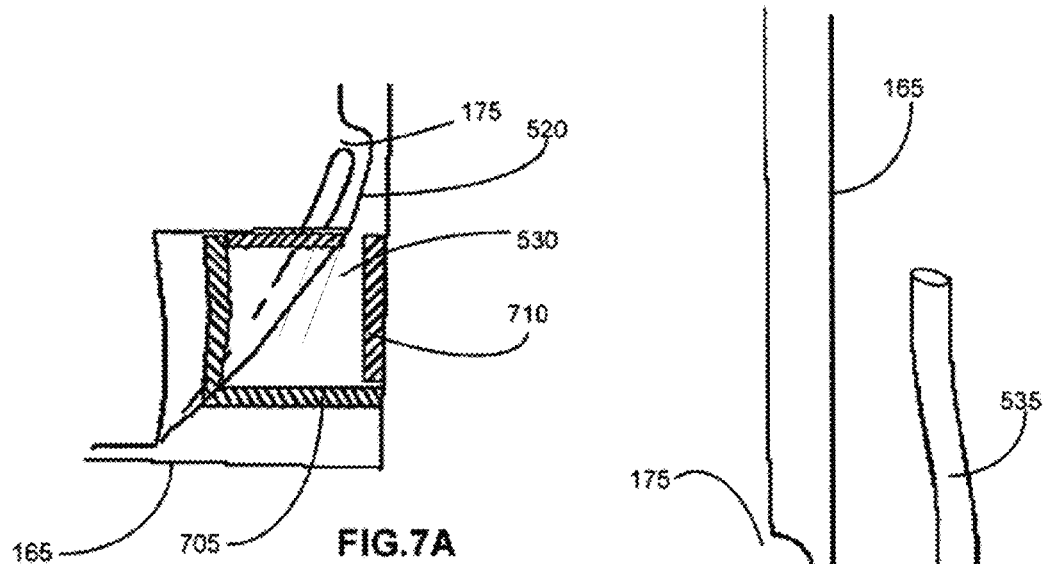
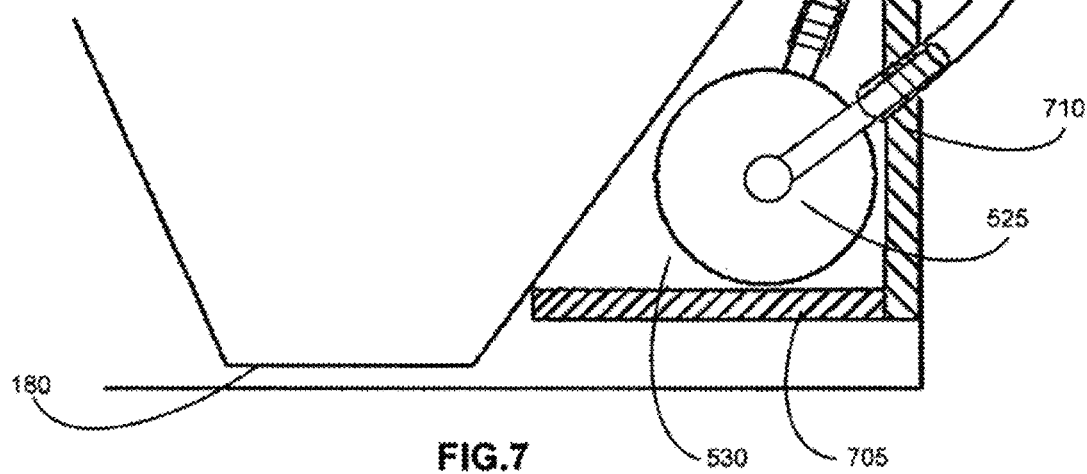

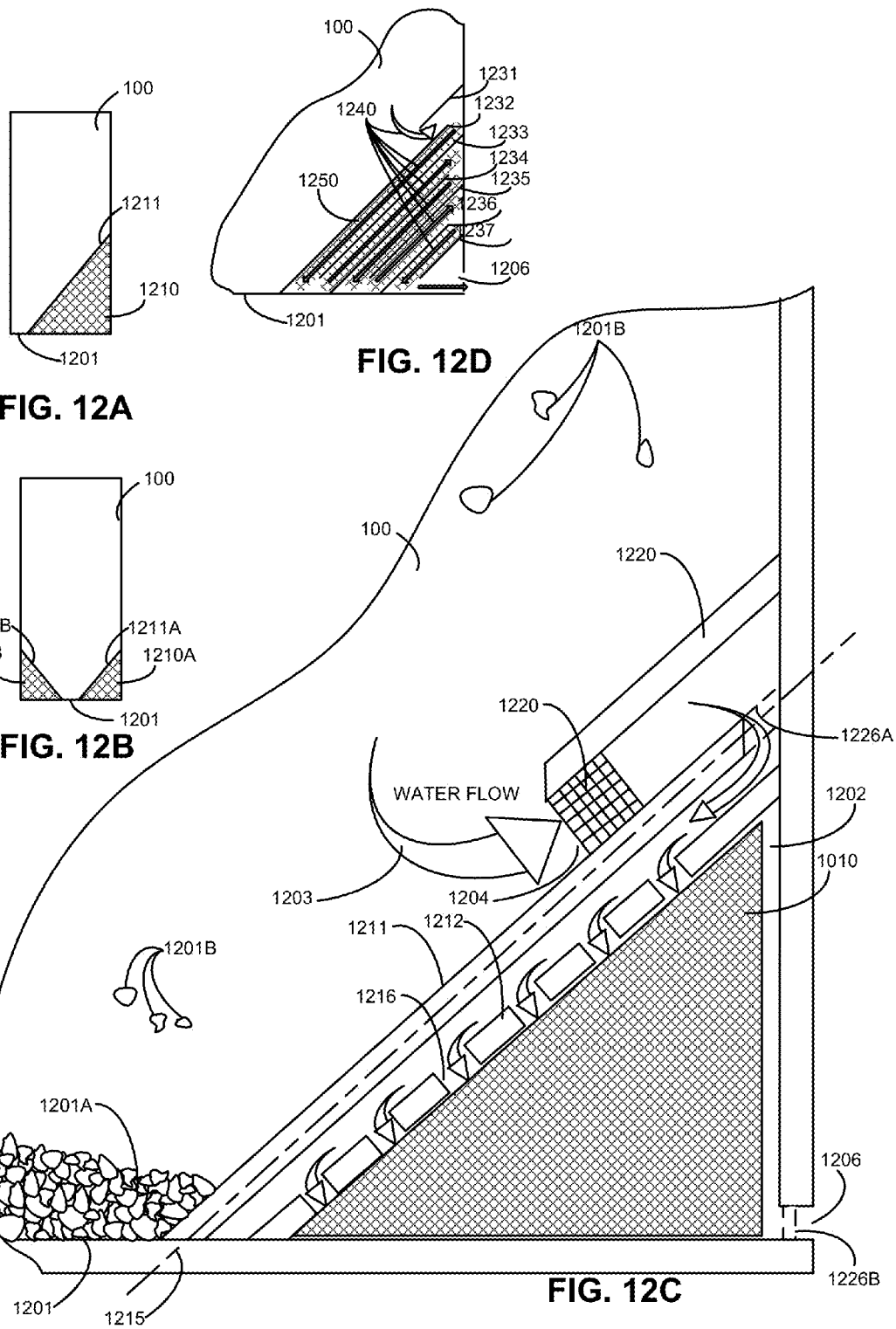

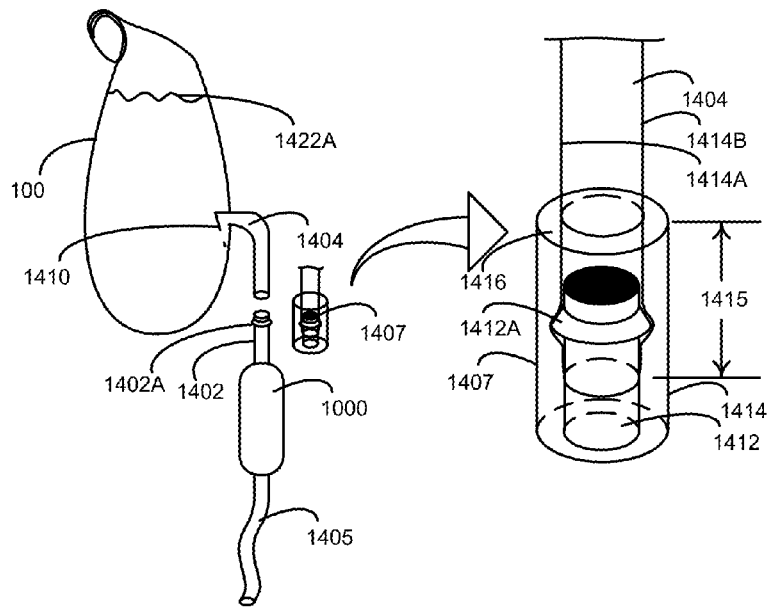
FIG. 14A
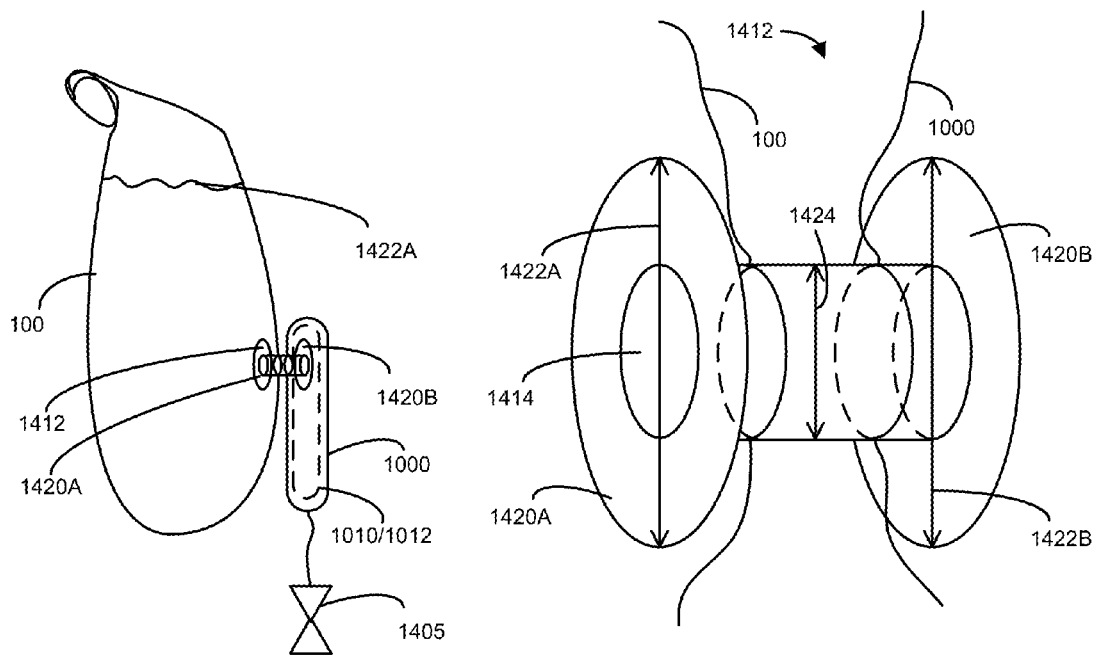
FIG. 14B  FIG. 14C

FIELD WATER PURIFICATION SYSTEM

CROSS REFERENCE TO RELATED APPLICATIONS

This is a continuation-in-part of and claims priority from U.S. patent application Ser. No. 12/418,598 filed on Feb. 4, 2010 and which has issued as U.S. Pat. 8,287,729 on Oct. 16, 2012, and entitled "Field Water Purification System," which is incorporated herein by reference in its entirety. The U.S. patent application Ser. No. 12/418,598 claims benefit and priority as a Continuation-in-part of U.S. patent application Ser. No. 12/111,130, filed Apr. 28, 2008 and which has issued as U.S. Pat. 7,514,006 on Apr. 7, 2009 and entitled "Field Water Purification System," the entire contents of which is incorporated herein by reference in its entirety.

BACKGROUND

The present disclosure generally relates to water treatment and more specifically to potable water treatment employed in a field environment.

Potable water is essential for life. However, in many parts of the world potable water is not readily available particularly under natural disasters conditions such as fires, drought, flooding or earthquakes which may have caused normal sources of potable water to become contaminated. As such, disaster relief response requires that potable water be made available to the disaster survivors as soon as possible. This frequently requires that potable water be brought in from other unaffected areas which is slow, costly and difficult to distribute to the those in the most need of the potable water. In many cases, indigenous water may be available and could suffice if adequate treatment could be performed to remove pathogenic organisms and other contaminants such as dissolved and suspended organic matter, toxic metals and sediment. As with supplied potable water, skid mounted or package water treatment systems require that the equipment be brought to the disaster location and operated from a generally centralized location from which potable water is distributed. While this response may be a viable solution over a protracted period of time, the disaster survivors located in remote areas may not be able to receive potable for several days, thus a need exists that provides a simple and effective way to provide potable water to disaster survivors before more elaborate water treatment systems are made available.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Broadly speaking, the present invention fills these needs by providing a field water purification system and method. It should be appreciated that the present invention can be implemented in numerous ways, including as a process, an apparatus, a system, computer readable media, or a device. Several inventive embodiments of the present invention are described below.

In one embodiment a field water purification system is described. The field water purification system includes a container and a filter coupled to an outlet port of the container. The container includes a first layer and a second layer of polymeric material. A first edge of the first layer is bonded to a first edge of the second layer. A second edge of the first layer is bonded to a second edge of the second layer. A first end of the first layer is bonded to a first end of the second layer. The outlet port is disposed in the first layer at a first distance from the first end.

The first layer and the second layer of polymeric material can be included in a folded first single sheet of polymeric material. The fold in the first single sheet of polymeric material can include the bond between the first edge of the first layer and the first edge of the second layer.

The filter can be detachably coupled to the outlet port. The outlet port can includes an outlet hose extending from the outlet port. The field water purification system can also include an outlet cap capable of capping the outlet port. The outlet cap includes an outer cover capable of protecting a selected length of the outlet hose.

The filter is a flat filter including a water tight enclosure, a filter inlet fluidly coupled to the water tight enclosure, a filter outlet fluidly coupled to the water tight enclosure and a filter envelope including a filter media, the filter envelope being disposed within the water tight enclosure, the flat water filter having a minimal thickness when not filled with water. The filter can also include a spacer disposed within the filter envelope and defining an inner filter volume within the filter envelope. The water tight enclosure can include a third layer and a fourth layer of polymeric material. A first edge of the third layer is bonded to a first edge of the fourth layer. A second edge of the third layer is bonded to a second edge of the fourth layer. A first end of the third layer is bonded to a first end of the fourth layer. A second end of the third layer is bonded to a second end of the fourth layer. The filter outlet is disposed in at least one of the third layer and the fourth layer and the filter inlet port disposed in at least one of the third layer and the fourth layer.

The third layer and the fourth layer of polymeric material can be included in a folded second single sheet of polymeric material and wherein the fold in the second single sheet of polymeric material includes the bond between the first edge of the third layer and the first edge of the fourth layer. The filter can include an outer channel defined between the filter envelope and the water tight enclosure and an intermittent barrier disposed within the outer channel. The intermittent barrier can include multiple bonded segments of the third layer and the fourth layer interspersed with multiple non-bonded segments of the third layer and the fourth layer, the nonbonded segments defining multiple openings in the intermittent barrier. The intermittent barrier can also include or alternatively include a secondary water tight enclosure secondary water tight enclosure having multiple perforations.

The container can include an external pocket and wherein the filter is disposed within the external pocket. The container can also include a floc barrier proximate to the outlet port. The container can include a thermally welded outlet tube coupled to the outlet port. The thermally welded outlet tube can include a fifth layer and a sixth layer of polymeric material. A first edge of the fifth layer is bonded to the first edge of the sixth layer and a second edge of the fifth layer is bonded to the second edge of the sixth layer to define a tube between the first edge and the second edge of the bonded fifth layer and sixth layer. The thermally welded outlet tube can include at least one of a folded portion and/or a rolled portion. The fifth layer can be an extension of the first layer and the sixth layer can be an extension of the second layer.

The field water purification system can also includes at least one strap, the at least one strap having a buckle. The container can also include a graphic on at least one side of the container. The graphic can include at least one of a fill line graphic and/or a minimum level line graphic.

The filter can include an ultraviolet filter. The container can include multiple straps capable of holding the container in a non-circular cross section. Each one of the multiple straps has a first end coupled to the first layer and a second end coupled to the second layer.

Another embodiment describes a flat water filter including a water tight enclosure formed of a collapsible material, a filter inlet fluidly coupled to the water tight enclosure, a filter outlet fluidly coupled to the water tight enclosure and a filter envelope including a filter media, the filter envelope being disposed within the water tight enclosure. The flat water filter having a minimal thickness when not filled with water.

Yet another embodiment provides a method for treating water including collecting a quantity of water in a container, adding a water treatment agent to the quantity of water in the container, closing the container, agitating the quantity of water in the container for a selected time, supporting the container in a substantially vertical orientation, allowing a plurality of flocs to settle a bottom portion of the container for a selected time period, dispensing treated water from an outlet port of the container, the outlet port being disposed a first distance away from the bottom portion of the container, coupling a detachably coupled filter to an outlet of the container and filtering the dispensed water through a flat water filter having a minimal first thickness when not filled with water and a second thickness greater than the first thickness when filled with water. Collecting the quantity of water in the container can include covering a selected portion of an outlet hose on an outlet port of the container from the collected water.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 1 is a front view of a water treatment system, in accordance with embodiments of the present invention.

FIG. 1A is a top view of a water treatment system, in accordance with embodiments of the present invention.

FIG. 1B is a bottom view of a water treatment system, in accordance with embodiments of the present invention.

FIG. 6 is a side view of a water treatment system in which one or more longitudinal baffles are provided, in accordance with embodiments of the present invention.

FIG. 6A is a detailed top view of a water treatment system in which at least one longitudinal baffle is provided, in accordance with embodiments of the present invention.

FIG. 6B is a detailed top view of a water treatment system in which at least one longitudinal baffle is used as an agitator, in accordance with embodiments of the present invention.

FIG. 7 is a side view of a water treatment system in which a filtration member is maintained within a receptacle, in accordance with embodiments of the present invention.

FIG. 7A is a detailed side view of a receptacle in which a filtration member for maintaining a filter member, in accordance with embodiments of the present invention.

FIG. 12A is a simplified front view of an elongated enclosure incorporating a filter, in accordance with embodiments of the present invention.

FIG. 12B is a simplified front view of an elongated enclosure incorporating a two part filter, in accordance with embodiments of the present invention.

FIG. 12C is a more detailed view front view of the filter, in accordance with embodiments of the present invention.

FIG. 12D is a simplified view front view of the filter, in accordance with embodiments of the present invention.

FIG. 14A is a side sectional view of an external filter removably coupled to the elongated container, in accordance with embodiments of the present invention.

FIG. 14B is a side view of an external filter coupled to the elongated container, in accordance with embodiments of the present invention.

FIG. 14C is a detailed view of the flanged inlet fitting, in accordance with embodiments of the present invention.

DETAILED DESCRIPTION

Figure 2:
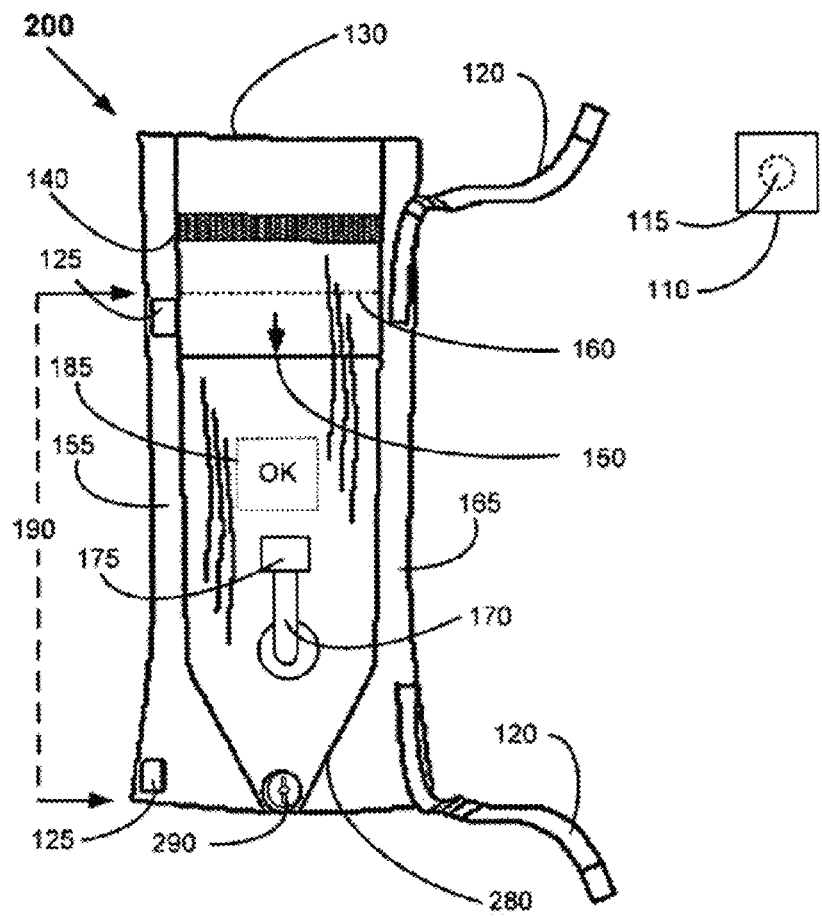
FIG. 2 is a front view of a water treatment system, in accordance with embodiments of the present invention.

Various exemplary embodiments of a water treatment system are described. In the following description, for the purposes of explanation, numerous specific details are set forth in order to provide a thorough understanding of the various exemplary inventive features. It will be apparent, however, to a person having ordinary skill in the art that the various exemplary inventive features may be practiced without these specific details.

In one exemplary embodiment, a lightweight water treatment system which can be easily distributed and employed by the disaster survivors for treating locally available freshwater sources. In accordance with one exemplary embodiment, a water treatment system for purifying water in a field environment is provided. In one exemplary embodiment, the water treatment system includes a water treatment agent for treating a predetermined volume of water obtained from a local freshwater source.

The water treatment agent includes a flocculant to remove suspended solids (flocs), a biocide to disinfect the obtained water from pathogenic organisms and/or activated charcoal for adsorbing hydrocarbons present in the obtained freshwater. The chemical constituency of the water treatment agent may be varied to address specific biological, chemical or radiological contaminates which may be present in the raw water to be treated. For example, ferric sulfate which is commonly used as a coagulating agent in conjunction with polymeric flocculating agents may be replaced with ferrous sulfate to change the oxidation state of contaminants and/or to bind with dissolved toxic metals such as arsenic, selenium, nickel, cadmium, lead and radium. Alternately, or in addition to the water treatment agent, chelating agents, for example, EDTA may be added to sequester harmful dissolved metals from the raw water.

Analogously, the type of biocide used may be varied typically from calcium hypochlorite to other halogenated compounds containing iodine or bromine which may prove more effective against certain types of pathogens.

By varying the treatment agents and/or biocides, it is possible to remove radioactive substances, turbidity, color, solids, colloids, dissolved organic compounds, nitrate/nitrite, pathogens, precipitation of dissolved metals/metalloids, and others toxins of concern. For example, removal of cyanobacterial toxins such as microcystin, cylindrospermopsisn, anatoxin, saxitoxin and DDT.

Referring to FIG. 1 a front view of one exemplary embodiment of an elongated container 100 is depicted. In one exemplary embodiment, the elongated container 100 is provided with a sachet 110 containing water treatment agents 115 for treating water collected using the elongated container 100. In one exemplary embodiment, the treatment agent includes one or more purifier of water sachets which are commercially available. An example of a commercially available water purification agent is PUR(R) manufactured by Proctor and Gamble, Co. The formulations of the PUR(R) Purifier of Water sachets is described in U.S. Pat. No. 7,153,438, entitled "Water Treatment Compositions and Masking Agent," issued Dec. 26, 2006 and U.S. Pat. No. 7,201,856, entitled "Water Treatment Compositions," issued Apr. 10, 2007. The latter and former patents are hereby incorporated by reference in their entirety as if fully set forth herein. Similar water purification agents could also be used to treat the water.

In one exemplary embodiment, the elongated container 100 is constructed from 2 or more sheets of polymeric material, each sheet having a thickness in a range of 6-40 mils. The polymeric material from which the elongated container 100 is constructed should be flexible, strong, collapsible and resistant to puncture, abrasion, and wear. In one exemplary embodiment, the polymeric construction material is transparent or translucent to allow for ultraviolet light to act as a biocide in lieu of a biocide or after the water treatment agents 115 have been mixed with the water to be treated. Exposure to solar ultraviolet light promotes disinfection with or without use of the water purification agents and chemicals (e.g., PUR (R) Purifier of Water sachets). Using solar UV light to disinfect the water is referred to as solar disinfection or "SODIS".

Potentially suitable polymeric materials for use constructing the elongated container 100 include but are not limited to low-density polyethylene, low-density linear polyethylene, high-density polyethylene, polypropylene, polyolephins, oriented polyethylene teraphthalates, polyvinyl floride, polyamides, polyarylsulfones, polyphthalamides, polysulfones, polyphenylsulfones, polyethersulfones, aliphatic polyketones, polyfluorocarbons, polybutadienes, polybutylene teraphthalates, polyesters, polyethylene teraphthalates, polyphenylene ethers, polyphenylene oxides, polyphenylene sulfides, polyphthalate carbonates, polypropylenes, polystyrenes, polyurethanes, polyvinyl chlorides. Thermoplastics are typically used due to their recycling ability. However, one skilled in the art will appreciate that various polymeric construction materials may be used to achieve a specific requirement.

Two or more layers of polymeric sheets (e.g., two or more polymeric sheets or one or more folded polymeric sheets) can be used for construction of the elongated container 100 are arranged to form a predetermined internal storage volume 190 dimensioned to coincide with the quantity of treatment agents 115 typically provided in a water purification additive 110. Standardized internal storage volumes are formed when at least two layers of polymeric sheets are thermally fused together. The container 100 can have a length-to-width ratios in a range of about 1:1 to about 8:1 depending on the volume of water to be retained in the internal storage volume 190 of the elongated container 100 and/or the manner in which the elongated container 100 is intended to be transported as is provided with the discussion accompanying FIGS. 4A-4D below.

The internal storage volume 190 of the elongated container 100 are typically constructed in volumes of 5, 10, 20 or 30 liters. Larger volumes become increasing more difficult to handle and transport due to water weight, flexibility and/or structural integrity of the elongated container 100.

The two or more layers of polymeric sheets are sealed on opposing longitudinal sides 155, 165 and laterally at the bottom end 180 (FIG. 1B) to form the elongated container 100. The bottom end 180 (FIG. 1B) of the elongated container 100 is used to collect sediments settling out of the water being treated within the internal storage volume 190.

Excess polymeric sheeting materials adjacent to seams surrounding the elongated container 100 formed by the thermal fusion process may used for attaching one or more straps 120, handles and/or grips 125 to the elongated container 100 for transporting the water treatment system as is provided with the discussion accompanying FIGS. 4A-4D below. In one exemplary embodiment, the remaining excess polymeric sheeting material is simply cut away from the completed elongated container 100.

The top end 130 opposite the sealed end 180 is used as a wide mouth port 135 (FIG. 1A) to admit water to be treated into the internal storage volume 190. An optional fill line marking 150 may be provided on the elongated container 100 to provide a visual indication to a user of the quantity of water to be collected. The internal storage volume 190 includes sufficient head space 160 to allow for the formation of an air bubble. The air bubble can be used to create a mixing vortex for mixing the water treatment agents 115 with the water contained in the internal storage volume 190 as is provided with the discussion accompanying FIG. 6 below.

The elongated container 100 is provided with a sealing member 140 to close the wide mouth port 135 of the elongated container 100. In one exemplary embodiment, the sealing member 140 is constructed from hook-and-loop fasteners (e.g., Velcro™) as is provided with the discussion accompanying FIGS. 3 and 3A below. In various embodiments, the sealing member 140 may be a draw string, a separately provided clamp, a pair of opposing and interlocking transverse ridges forming a zipper-like resealable seal (e.g., Ziploc™), tape (e.g., duct tape), a twist-tie, a tie-wrap or any other simple sealing device.

In one exemplary embodiment, a discharge port 175 is mounted on a stem 170 for releasing treated water from the internal storage volume 190. The elongated container 100 may be oriented so as to allow gravity feed of water through the discharge port 175. The discharge port should be located about 3"-6" above the bottom end of 180 of the elongated container 100, 200 or otherwise superjacent to the bottom end 180. Alternately, a user may squeeze the elongated container 100 to force water from the internal storage volume 190 and out through the discharge port 175. In one exemplary embodiment, the discharge port 175 requires an upward or downward pulling action to allow water to be released from the internal storage volume 190. The stem 170 is attached through the wall of the elongated container 100 typically by a thermal fusion process or an adhesive and/or vulcanization process. One skilled in the art will appreciate that any suitable valve mechanism will work with the arrangement.

In one exemplary embodiment, a clarity indicator 185 is provided which allows a user to visually determine the effectiveness of the treatment agents based on the ability to observe a graphic and/or text through the elongated container 100. The clarity indicator 185 may be a simple adhesive label applied to the elongated container after construction.

Referring to FIG. 2, a second exemplary embodiment of the elongated container 200 is depicted. In this embodiment, the bottom end 280 of the internal storage volume 190 is provided with a conical shape to facilitate the capture and removal of sediment from the internal storage volume 190. A drain plug 290 can be included to allow the captured sediment to be removed from the bottom end of the elongated container 200. The removal of the captured sediment may be advantageous in certain situations to improve disinfection of the water remaining in the internal storage volume 190 and/or to prevent resuspension of flocs. All other aspects of this embodiment are similar to those provided in the discussion accompanying FIGS. 1, 1A, 1B.

Figure 2B:
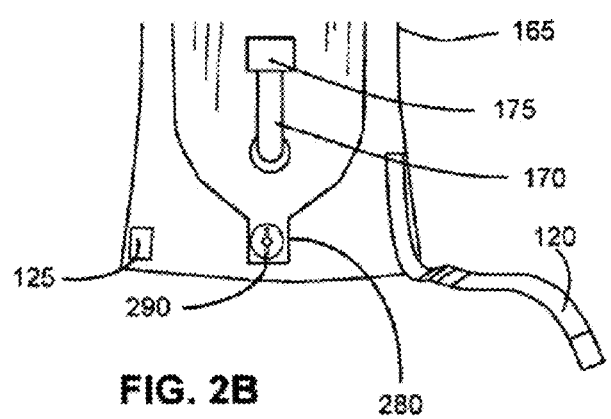
FIG. 2B is a detailed front view of a discharge port, in accordance with embodiments of the present invention.
Figure 2A:
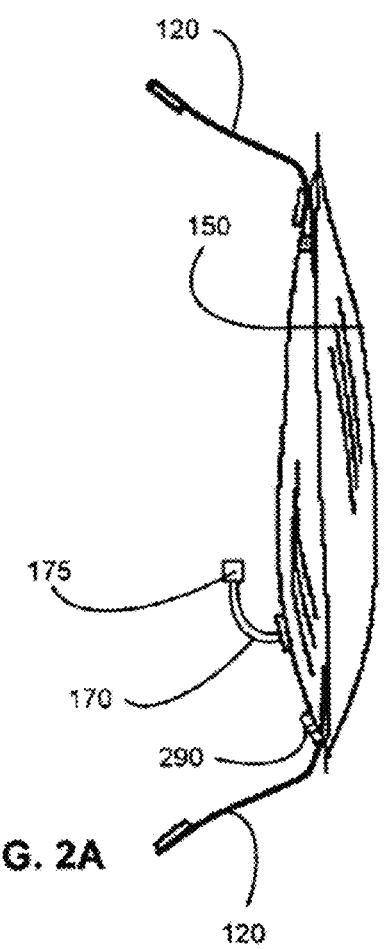
FIG. 2A is a side view of a water treatment system, in accordance with embodiments of the present invention.

Referring to FIG. 2A a side view of the second embodiment of the elongated container 200 is depicted. In this embodiment, the general baglike structure of the elongated container 200 is visible. As previously discussed, the dimensions of the elongated container 200 is dependent on the desired internal storage volume 190 (FIG. 2) and/or the way in which the elongated container is intended to be transported. FIG. 2B depicts a detailed front view of one exemplary embodiment a lower portion of the elongated container 200 in which the bottom end 280 is tapered to allow the captured sediment to be removed from the bottom end of the elongated container 200. Hereinafter, the various embodiments of the elongated container will be referred to as the elongated container 100, 200.

Figure 3:
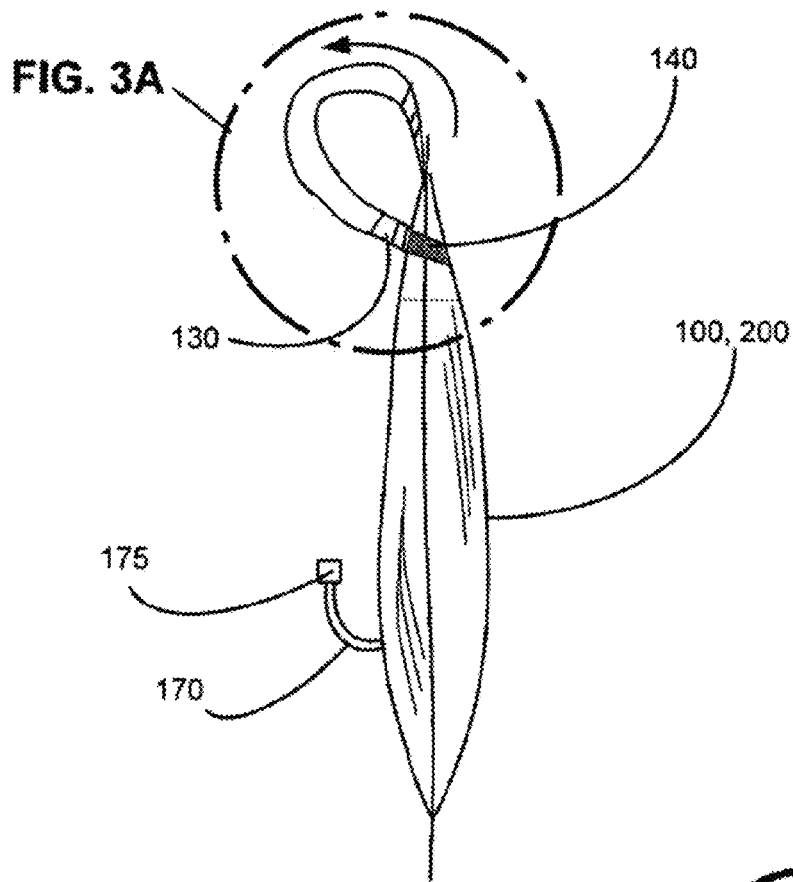
FIG. 3 is a side view of a sealing member, in accordance with embodiments of the present invention.
Figure 3A:
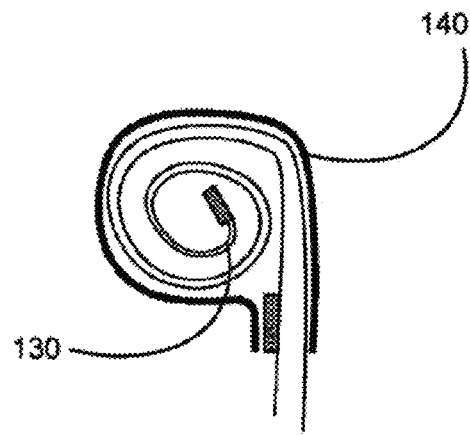
FIG. 3A is a detailed side view of a sealing member, in accordance with embodiments of the present invention.

Referring to FIG. 3, one exemplary embodiment of a sealing member 140 is depicted in which an upper portion of the various embodiments of the elongated container 100, 200 above a fill line marking 150 is rolled up and held in place by hook-and-loop fasteners 140 as is depicted in FIG. 3A. In this embodiment, one or more strips of hook-and-loop fasteners 140 extend longitudinally over the end 130 of the elongated container 100, 200 and securely maintain the rolled portion of the elongated container in place to prevent collected water from being accidentally released through the wide mouth port 135 (FIG. 1A).

Referring to FIG. 4A-D, a plurality of transport arrangements are possible by changing the positions and/or adding straps 120 to the elongated container 100, 200. For example, in FIG. 4A, the elongated container 100, 200 is configured as a sling in which a person is able to transport collected water by draping a strap diagonally across a trunk of the body. In the sling configuration, a length-to-width ratio of 3:1 to 8:1 (when sealed) is generally used for internal storage volumes 190 (FIGS. 1 and 2) ranging between 10 and 20 liters of water. In one exemplary embodiment, the elongated container 100, 200 is approximately 36" in length with a diameter of approximately 5" for containing about 10 liters. In one exemplary embodiment, the elongated container 100, 200 is approximately 36" in length with a diameter of approximately 7" for containing about 20 liters of water. When configured with the length-to-width ratio of between about 1:1 to 8:1, the elongated container 100, 200 essentially forms a flexible cylinder which conforms to the person's shape during transport.

Figure 4A:
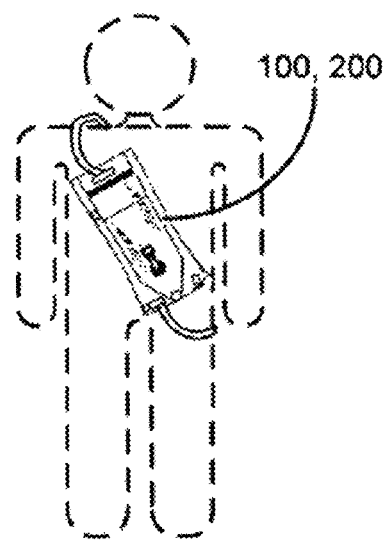
FIG. 4A is a water treatment system arranged as a sling, in accordance with embodiments of the present invention.
Figure 4B:
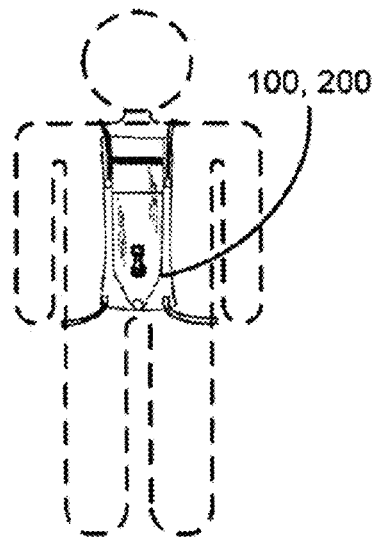
FIG. 4B is a water treatment system arranged as a backpack, in accordance with embodiments of the present invention.

In FIG. 4B, the elongated container 100, 200 is configured as a backpack. In this exemplary embodiment, the length-to-width ratio ranges from about 3:1-4:1. In this embodiment, the length of the internal storage volume 190 (FIGS. 1 and 2) is about 22" with a diameter of approximately 6" for 10 liters of water. For 20 liters of water the diameter is increased to approximately 8.5".

Figure 4C:
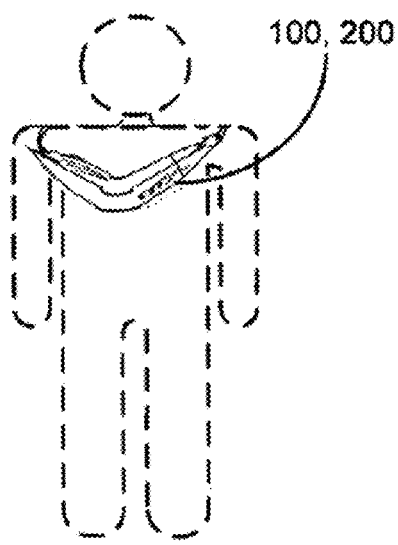
FIG. 4C is a water treatment system arranged as a neck pack, in accordance with embodiments of the present invention.

In FIG. 4C, the elongated container 100, 200 is configured as a neck pack. In this exemplary embodiment, the length-to-width ratio and dimensions approximates those of the sling configuration shown in FIG. 4A. However, the dimensions of any of the transport configurations may be adjusted to better serve populations of various statures.

Figure 4D:
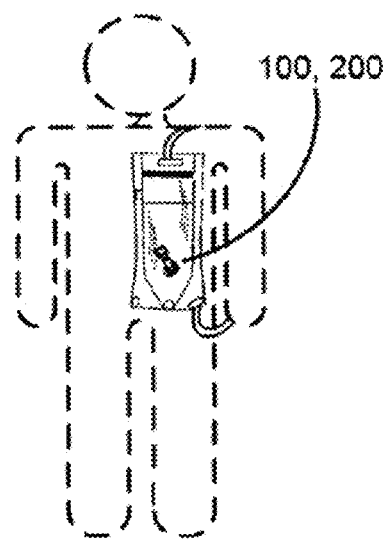
FIG. 4D is a water treatment system arranged as a purse pack, in accordance with embodiments of the present invention.

In FIG. 4D, the elongated container 100, 200 is configured as a purse pack which is carried or hung from a shoulder of the person. In this exemplary embodiment, the length-to-width ratio and dimensions approximates those of the sling configuration shown in FIG. 4A. However, the dimensions of any of the transport configurations may be adjusted to better serve populations of various statures.

Figures 5, 5A, 5B:
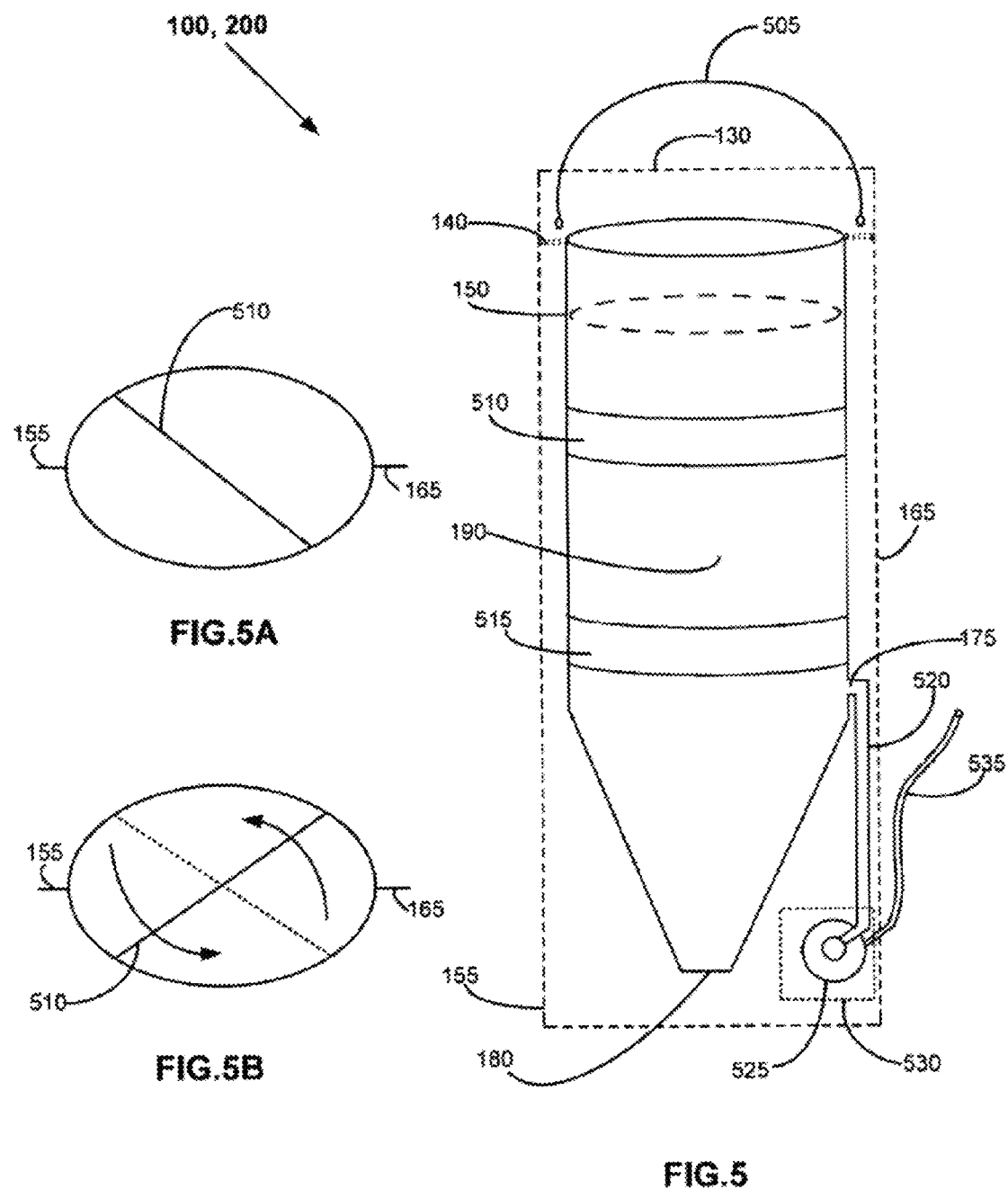
FIG. 5 is a side view of a water treatment system in which one or more lateral baffles are provided, in accordance with embodiments of the present invention.
FIG. 5A is a detailed top view of a water treatment system in which at least one lateral baffle is provided, in accordance with embodiments of the present invention.
FIG. 5B is a detailed top view of a water treatment system in which at least one lateral baffle is used as an agitator, in accordance with embodiments of the present invention.

FIG. 5 depicts one exemplary embodiment of the elongated container 100, 200 in which one or more lateral baffles 510, 515 are provided to improve mixing of water to be treated within the internal storage volume 190. In one exemplary embodiment, a handle, strap, or like grip 505 is provided which may attached to an upper portion of the elongated container 100, 200 in proximity to the wide mouth port 135. In this embodiment, a user maintains the elongated container 100 in an upright position as shown in FIG. 5A (top view) and axially rotates the elongated container 100 back and forth as shown in FIG. 5B. The lateral baffles 510, 515 improve mixing efficiency by causing eddies and bubbles to be formed in the internal volume of water contained in the elongated container 100, 200. The lateral baffles 510, 515 may be constructed from the same materials used to form the elongated container 100, 200 or made from a more rigid material.

In another embodiment, the lateral baffles 510, 515 can be substantially minimized to one or more small strips or strings capable of holding the elongated container 100, 200 in a non-circular cross section (e.g., having a width side to side greater than a depth front to back) when filled with water. Rotating the non-circular cross section elongated container 100, 200 uses the inertia of the water against the walls and corners to generate eddy currents and cause the water to mix.

In one exemplary embodiment, a filtration member 525 is configured to receive water from the discharge port 175, typically by a short conduit 520 which sealingly couples the discharge port to the filtration member 525. The discharged water is filtered by the filtration member 525 and released to a treated water supply conduit 535 for consumption. In one exemplary embodiment, the filtration member 525 is maintained within a compartment or receptacle 530 formed by two or more parallel layers of polymeric material (e.g., two or more sheets of polymeric material or one or more folded sheets of polymeric material). Alternately, a separate compartment or receptacle may be affixed to the elongated container 100, 200 proximate to the discharge port 175.

FIG. 6 depicts one exemplary embodiment of the elongated container 100, 200 in which one or more longitudinal baffles 610, 615 are provided to improve mixing of water to be treated within the internal storage volume 190. The longitudinal baffles 610, 615 extend lengthwise along a portion of the elongated container 100, 200. Similar to the lateral baffles 510, 515, the longitudinal baffles 610, 615 are provided to improve mixing of water to be treated within the internal storage volume 190. By way of example, the longitudinal baffles 610, 615 can improve mixing efficiency of the water within the internal storage volume 190 by causing eddies and bubbles to be formed in the internal volume of water contained in the elongated container 100, 200 as the elongated container is axially rotated side to side. By way of example, the longitudinal baffles 610, 615 can create eddies and bubbles in the water with the elongated container 100, 200 is axially rotated or agitated as the elongated container is laying on the ground or other substantially horizontal support surface or supported substantially vertically or upright orientation such as suspended from any suitable fixed support (e.g. a stand, a tree, a vehicle, etc.) as shown in FIG. 5B.

In one exemplary embodiment, a handle, strap, grip or the like 505 is provided which may attached to an upper portion of the elongated container 100, 200 in proximity to the wide mouth port 135. The longitudinal baffles 610, 615 may be constructed from the same materials used to form the elongated container 100, 200 or made from a more rigid material.

Also as discussed above, in one exemplary embodiment, a filtration member 525 is configured to receive water from the discharge port 175, typically by a short conduit 520 which sealingly couples the discharge port to the filtration member 525. The discharged water is filtered by the filtration member 525 and released to a treated water supply conduit 535 for consumption. In one exemplary embodiment, the filtration member 525 is maintained within a compartment or receptacle 530 formed by two or more parallel sheets of two or more parallel. Alternately, a separate compartment or receptacle may be affixed to the elongated container 100, 200 proximate to the discharge port 175.

FIG. 7 depicts one exemplary embodiment of an elongated container 100, 200 in which a filtration member 525 is maintained within a compartment or receptacle 530 formed from parallel sheets of polymeric material or pouch fused to the elongated container 100, 200 along a lateral surface to all a person set elongated container 100, 200 on an end. In one exemplary embodiment, the filtration member 525 receives treated water from the discharge port 175 and is disposed superjacent to the conical end 180 of the elongated container 100, 200. The treated water is routed to the filtration member 525 by a short conduit 520, filtered by the filtration member 525 and discharged into an end of the treated water supply conduit 535. FIG. 7A illustrates the two or more parallel sheets of polymeric material 705, 710 which form the compartment or receptacle 530 in which the filtration member 525 is maintained. The two or more parallel sheets of polymeric material 705, 710 may encompass the filtration member 525 by use of a pair of opposing and interlocking transverse ridges, tape, a twist-tie, a tie-wrap, hook-and-loop fasteners, snap fasteners and any combination thereof.

Figure 8:
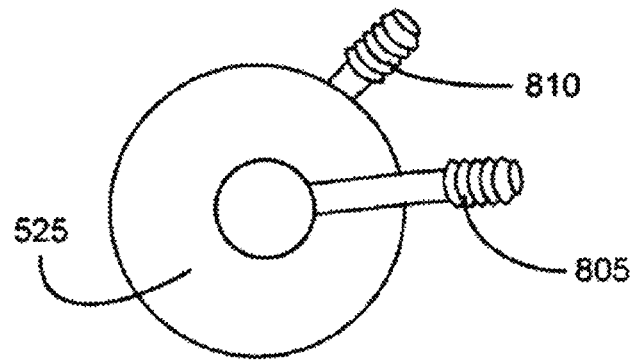
FIG. 8 is a top view of a filtration member suitable for use with a water treatment system, in accordance with embodiments of the present invention.

FIG. 8 depicts one exemplary embodiment of a filtration member 525 suitable for use with the water treatment system. In one exemplary embodiment, the filtration member is configured as a generally circular container having a relatively thin cross-sectional profile in order to be maintained in the compartment or receptacle 530 described above. It should be understood that the filtration member 525 can be other shapes (tubular, rectangular, etc.) as well as circular.

Figure 8A:
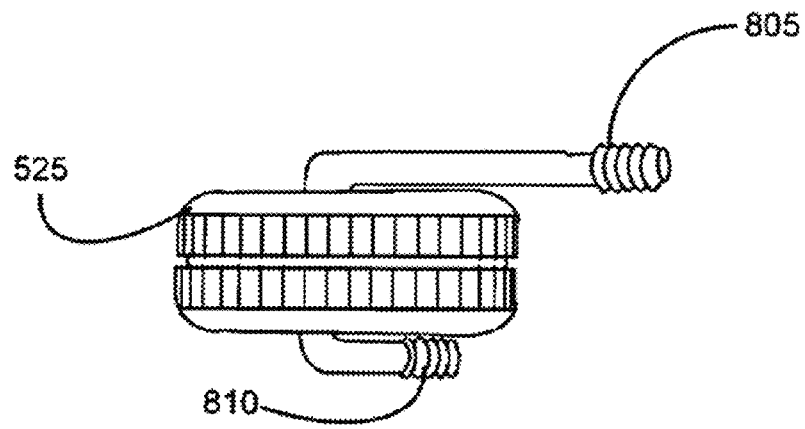
FIG. 8A is a side view of a filtration member suitable for use with a water treatment system, in accordance with embodiments of the present invention.
Figure 8B:
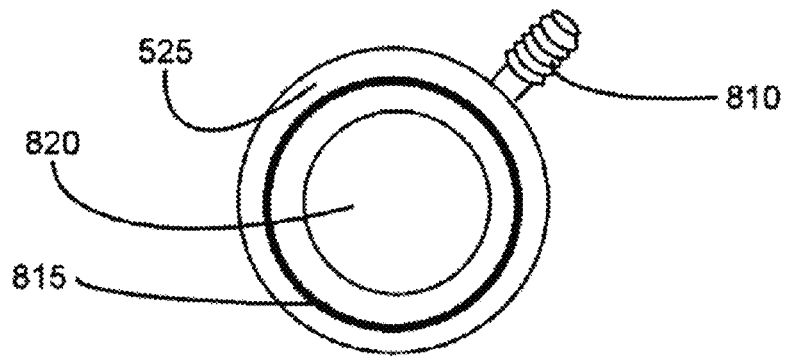
FIG. 8B is a top view of a separated filtration member suitable for use with a water treatment system, in accordance with embodiments of the present invention.

An inlet nozzle 805 is provided on one side of the filtration member 525 which receives water to be filtered internally. An outlet nozzle 810 is provided on an opposite side of the filtration member 525 which discharges the filtered water to the treated water supply conduit 535 as described above. FIG. 8A provides a side view of the filtration member 525. In one exemplary embodiment, the filtration member 525 is provided in a clamshell arrangement (not shown) in which each half of the filtration member 525 separate in opposition using a hinge to allow access to a filter 820 (FIG. 8B).

In another embodiment, the filtration member 525 is provided in a two part threaded arrangement (not shown) in which each half of the filtration member 525 is thread coupled together. Access to the filter element 820 (FIG. 8B) is accomplished by unscrewing one half of the filtration member 525 from the other half. FIG. 8B provides an internal view of the filtration member 525 in which the filter element 802 is concentrically maintained within one half of the filtration member 525. In one exemplary embodiment, an "O" ring 815 is provided to prevent leakage of the water to be treated from the filtration member 525. The filter element 820 may utilize woven or non-woven fibers, ceramic membranes or other filter media known in the relevant art.

For fabric (woven or nonwoven) filters or screens should be selected with an effective porosity of less than or equal to 0.5 mm openings. Actual filter media should utilize an effective pore size of 0.2 to 300 micrometer with an initial target range of 0.5 to 10 micrometer. In addition, the filter element 820 may include other water treatment agents such as activated charcoal and/or biocides to improve the quality of water to be consumed by the person.

One skilled in the art will appreciate that any number of filtration member configurations and filter media types may be used. For example, the filtration member 525 may be directly connected to the discharge port 175 without the short conduit 520. Alternately, the filtration member could be directly attached to the discharge end of the treated water supply conduit 535 which would eliminate the short conduit 520 altogether.

Figure 9:
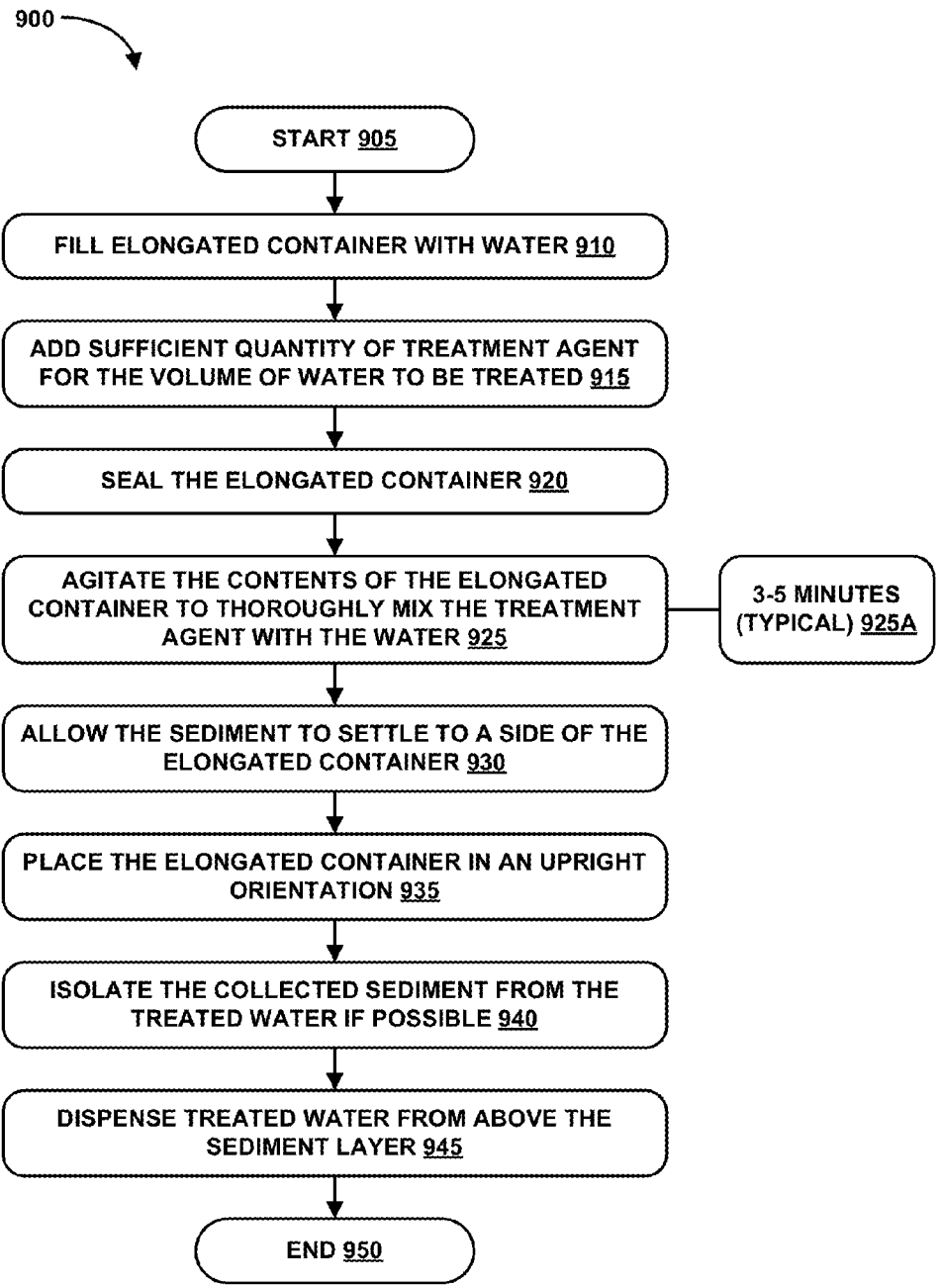
FIG. 9 is a process for treating water using the water treatment system, in accordance with embodiments of the present invention.

Referring to FIG. 9, a process for treating water using either embodiment of the water treatment system is depicted. The process 900 is initiated by a user filling an elongated container 100, 200 to the fill line marking 150. The large mouth port 135 may be stretched open by hand and submerged into a water source, such as a stream, in order to fill the elongated container 100, 200. The water level in the elongated container 100, 200 should allow room in order for a mixing bubble of a predetermined size to form within the headspace 160.

The collection of twigs, leaves, large particles and other debris should be minimized where possible. In one exemplary embodiment, a mesh or cloth filter is provided to inhibit the collection of the solid matter. Floating matter such as oils and scum should likewise be avoided by collecting from below the water surface. If floating matter is inadvertently collected, the user may squeeze the elongated container sufficiently to discharge the floating matter out through the large mouth port 135.

The large mouth port 135 at the end of the elongated container 130 is then sealed using the sealing member 140 as previously described above. The elongated container 100, 200 is then carried and/or transported to a safe location as necessary for performing the water treatment.

To treat the collected water, the large mouth port 135 at the end of the elongated container 130 is opened and the provided treatment agents are added 915. The water purification agents may be in the form of a single powder, liquid, or tablet as is provided in the PUR(R) Purifier of Water discussed above. The PUR(R) Purifier of Water is intended to treat volumes of water in 10 liter amounts. Therefore, greater volumes will require additional sachets of PUR(R) Purifier of Water. Alternately, separate disinfectants, coagulants, flocculants and/or chelating agents or other water purification agents may be added in lieu of the PUR(R) Purifier of Water in amounts specified by the manufacturer of the specific water treatment agent. In one exemplary embodiment, powdered activated charcoal may be included with the water treatment agents to remove organic contaminants such as gasoline or pesticides. Once the water treatment agents have been added to the water to be treated, the large mouth port 135 at the end of the elongated container 130 is then resealed using the sealing member 140 as previously described above 920.

The contents of the elongated container 100, 200 is then agitated to thoroughly mix the treatment agents with the collected water 925. Agitation is typically performed for 3 to 5 minutes to ensure sufficient flocculation and mixing of the treatment agents with the water to be treated 925A. Agitation may be accomplished by the user grasping the two ends 130, 180 of the elongated container 100, 200 and repeatedly inverting the elongated container 100, 200 to cause bubbles to rapidly move from one end of the elongated container 100, 200 to the other. Alternately, the elongated container 100, 200 may be axially rotated to cause thorough mixing as described above. Vigorous agitation should be continued for approximately 30 seconds. The generated bubbles provide displacement mixing by creating vortexes in the water during movement. The optimal rate of inverting or axial oscillations is 30-60 cycles per 30 seconds of rapid mixing.

Alternately, the elongated container 100, 200 may be axially rolled on the ground, or shaken from end-to-end by alternately lifting and lowering an end of the elongated container 100, 200. Following the vigorous agitation, agitation is initiated for about 3 to 10 minutes by rocking or axially rotating the elongated container 100, 200 at rate of approximately 75 to 110 oscillations per minute. Bubbles and/or baffles 510, 515, 610, 615 included in the elongated container 100, 200 provide the displacement agitation to create flocs that are large enough to rapidly settle.

Alternately, transporting the elongated container 100, 200 on foot for 10-20 minutes also may provide sufficient agitation. If a smooth, lateral surface is available, the elongated container 100, 200 may be rolled for 3-10 minutes to achieve the agitation. Longer agitation times may be required when water temperatures are below approximately 15.degree. C.

In one exemplary embodiment, the elongated container 100, 200 is then placed in a horizontal orientation to allow sediment to settle 930 to the bottom of the elongated container 100, 200 for at least 5 minutes, or until no flocs are visible in the treated water. In another embodiment, the elongated container 100, 200 is maintained in a vertical orientation which allows the flocs to settle into the conical end 180 of the elongated container 100, 200. In one exemplary embodiment, a sequence of horizontal and vertical orientations of the elongated container 100, 200 during settling may be advantageous. For example, allowing the flocs to settle in a horizontal alignment for 5-15 minutes, followed by vertically orienting the elongated container 100, 200 until a total of 30 minutes has elapsed. (30 minutes is approximately the amount of time needed for disinfection by the biocide.)

An indicator of successful flocculation and sedimentation is the improved clarity of the treated water, which should be apparent through the translucent polymeric construction of the elongated container 100, 200. After the horizontal settling, the elongated container 100, 200 is carefully placed in an upright orientation 935 by slowly lifting one end of the elongated container until the sediment moves to the collection end 180, 280 of the elongated container 100, 200. Vertical settling should be assumed to be completed when no flocs are visible in the water column Tapping of the walls of the elongated container 100, 200 may be required to dislodge any clinging flocs.

If possible, the collected sediment should be isolated from the clarified water 940 as the accumulated sediment may still contain live pathogenic organisms and thus should not be allowed to contaminate the treated water 940. The sediment isolation may be accomplished by placing a clamp across the elongated container 100, 200 at about three to six inches above the sediment layer or alternately by using the drain plug 290 available in the second embodiment of the elongated container 200.

The treated water may be dispensed from the clarified end of the elongated container 100, 200 after the sediment is removed or isolated and after disinfection has been completed 945. The discharge port 175 may included an integrated valve, filtration member 525 and/or closeable stem 170 coupled to one wall of the elongated container 100, 200. If filtration is provided at the discharge port 175, the closure of the discharge port should be nearly flush with the wall of the elongated container 100, 200 in order to minimize the risk of trapping flocs potentially containing pathogens in the stem 170. This completes the water treatment process 950.

In the foregoing specification, the various exemplary inventive features have been described with reference to specific embodiments herein. For example, the elongated container 100, 200 and water treatment agent 110 may be used for military and/or recreational purposes as well as disaster relief.

Additional Embodiments

Figure 10A:
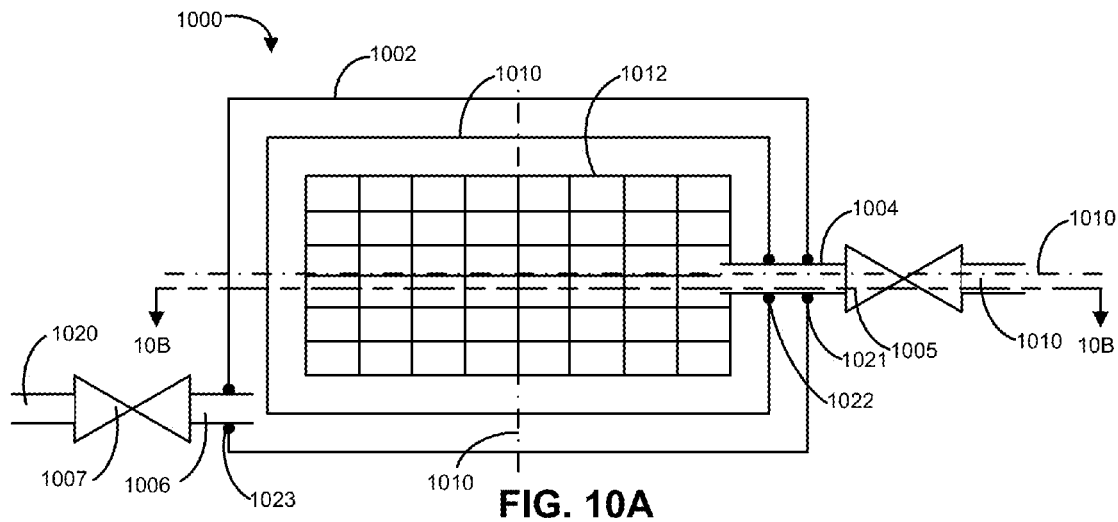
FIG. 10A is a simplified front view of a filter, in accordance with embodiments of the present invention.
Figure 10B:
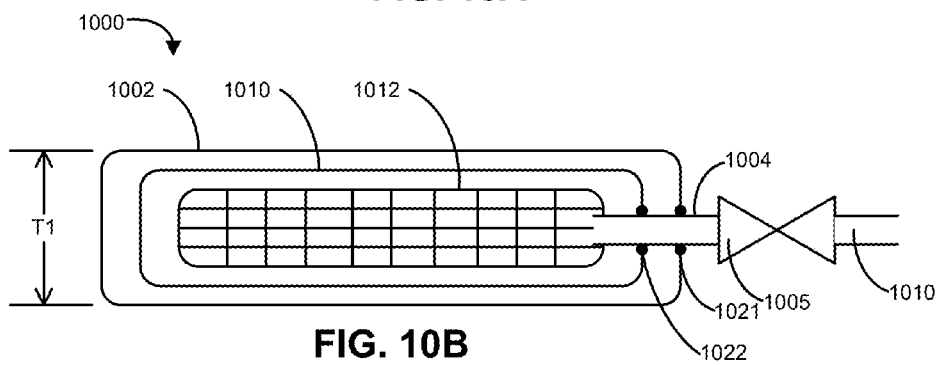
FIG. 10B is a sectional view 10B-10B of the filter, in accordance with embodiments of the present invention.

FIG. 10A is a simplified front view of a substantially flat filter 1000, in accordance with embodiments of the present invention. FIG. 10B is a side sectional view 10B-10B of the substantially flat filter 1000, in accordance with embodiments of the present invention. FIG. 10C is a pictorial view of a spacer 1012, in accordance with embodiments of the present invention. The side sectional view 10B-10B of the substantially flat filter 1000 is shown with the filter 1000 filled with water and being used. The flat filter 1000 is shown flattened in FIGS. 13A, 13B below. The filter 1000 includes a water tight enclosure 1002, an inlet 1004, an outlet 1006, a filter envelope 1010 and a spacer 1012.

The filter 1000 is substantially flat when not in use (e.g., minimal thickness T1). When in use, the flat filter 1000 fills with water and thus can increase in physical volume several times or even several hundred times of the unused volume. In comparison, a typical cylindrical or other shaped filters has the same volume in use or not in use due to the firm shape of the typical filter. The flat filter 1000 can be packed in bulk quantities in a much smaller volume than typical filters, further reducing the packaging and shipping cost of the flat filter 1000. The flat filter 1000 is also cheaper to manufacture than the typical filter as will be described in more detail below.

The water tight enclosure 1002 can be formed from any suitable material. The water tight enclosure 1002 can be formed from material similar to the elongated container 100 and using similar manufacturing methods. The water tight enclosure 1002 can be formed from many other materials including metal, plastic, plastic film, foil (e.g., boPET foil laminate (Mylar)), and other suitable materials.

The filter envelope 1010 can be formed from any suitable filter media. By way of example, the filter envelope 1010 can be formed from one or more layers of fabric, one or more membranes, hollow fiber membranes, granular filtration media, fibrous filtration media, injected foams other suitable filtration media and combinations thereof.

The inlet 1004 is fluidly coupled to the elongated container 100 to allow water to flow from the elongated container into the filter inlet 1004. The inlet 1004 is sealed to the water tight enclosure 1002 by seals 1021. The inlet 1004 is sealed to the filter envelope 1010 by seals 1022. The inlet 1004 may optionally open inside the inner volume 1012A formed by the spacer 1012 and the water that fills the filter 1000 when in use. The spacer 1012 can collapse substantially flat when not in use so that the filter 1000 can flatten and have a minimal thickness T1 when not in use (e.g., during packaging, shipment, storage, etc.).

The filter outlet 1006 is fluidly coupled to a hose 1020 to allow water to flow from the filter 1000. The filter outlet 1006 can be smaller than or otherwise flow constricted as compared to the inlet 1004 to increase the residence time of the water within the filter 1000. By way of example, the filter outlet 1006 can include a narrowed slip or other smaller aperture or orifice as compared to the inlet 1004.

The outlet 1006 is sealed to the water tight enclosure 1002 by seals 1023. The seals 1021, 1022, 1023 can be formed by any suitable means such as thermal bonding, mechanical compression fitting, or as being formed by thermal welding two or more sheets together to form the inlet and outlet such as a continuation of two or more sheets of material forming the water tight enclosure 1002. It should be understood that the filter outlet 1006 can be located in any suitable location on the filter 1000 and not only where illustrated.

The inlet 1004 can include an inlet valve 1005 to isolate the filter 1000 from the elongated container 100. The outlet 1006 can include an outlet valve 1007 to control flow from the filter 1000. The outlet valve 1007 can also prevent back flow from the hose 1020, into the filter 1000 such as may occur during filling of the elongated container 100. The inlet valve 1005 and the outlet valve 1007 can be any suitable valve type such as a gate or ball valve or a pinch type valve structure using a compression device (e.g., a binder clip, clamp, clothes pin, roll and ramp-type flow control, folding the respective tube, etc.) to clamp off or otherwise control flow through the valve. The inlet valve 1005 could be incorporated into the outlet port of the elongated container 100.

Figures 10D, 10E, 10F:
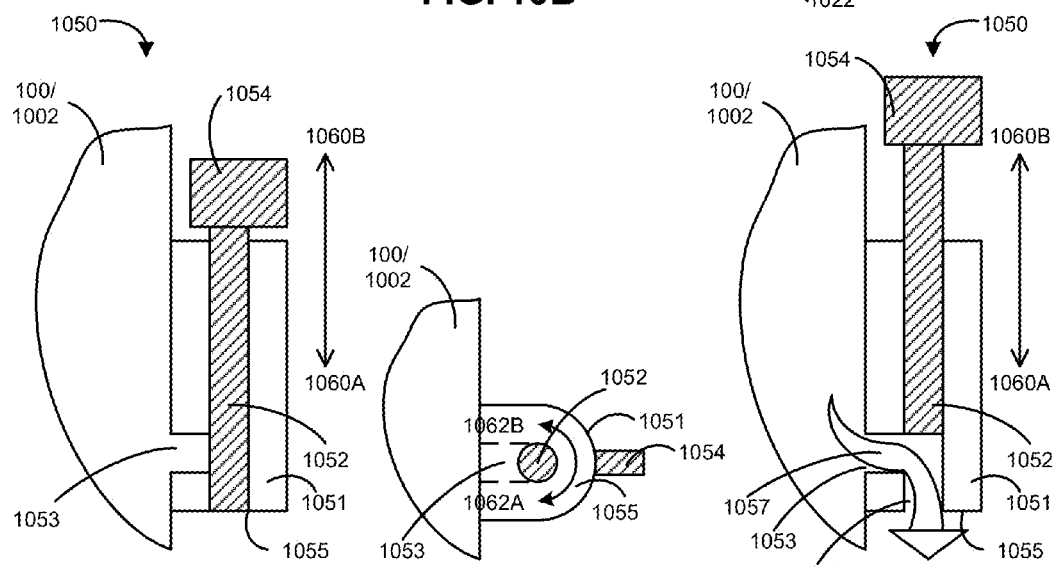
FIG. 10D is a side sectional view of a closed flat face valve, in accordance with embodiments of the present invention.
FIG. 10E is a view of the flat face of the closed flat face valve, in accordance with embodiments of the present invention.
FIG. 10F is a side sectional view of an opened flat face valve, in accordance with embodiments of the present invention.
Figure 10C:
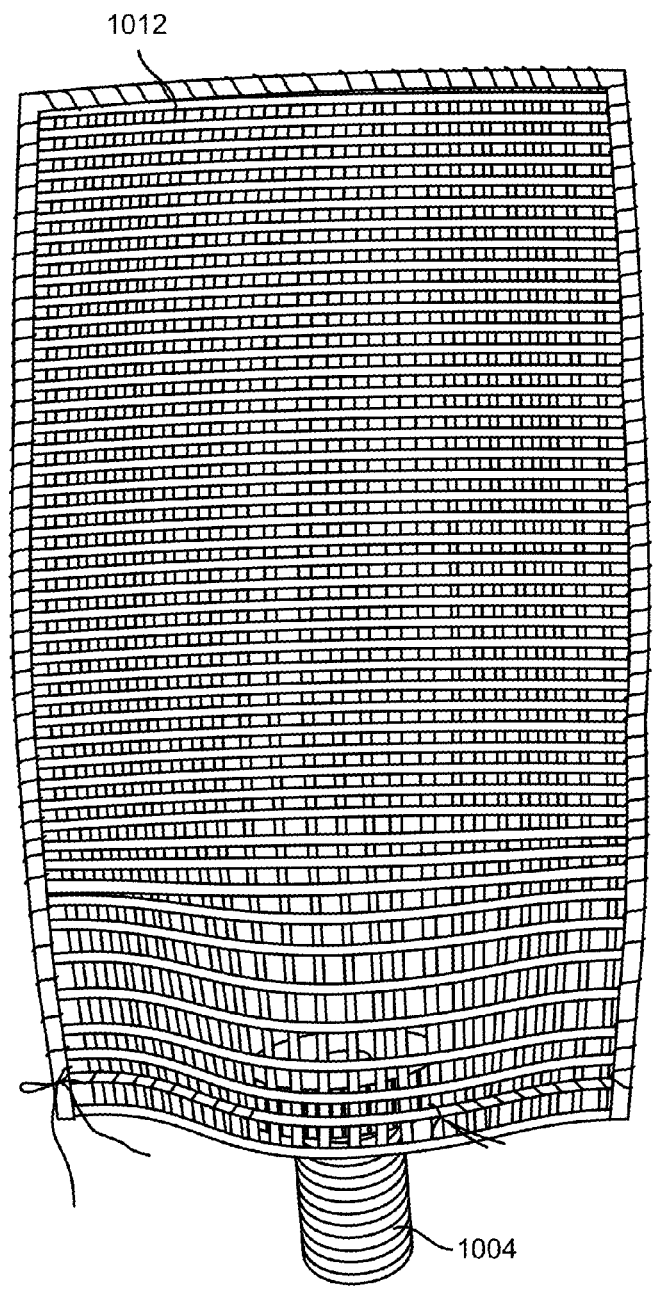
FIG. 10C is a pictorial view of a spacer 1012, in accordance with embodiments of the present invention.

FIG. 10D is a side sectional view of a closed flat face valve 1050, in accordance with embodiments of the present invention. FIG. 10E is a view of the flat face 1055 of the closed flat face valve 1050, in accordance with embodiments of the present invention. FIG. 10F is a side sectional view of an opened flat face valve 1050, in accordance with embodiments of the present invention. The flat face valve 1050 can be used for the inlet valve 1005 or any other suitable valve. The flat face valve 1050 includes a flat face 1055 when the flat face valve is closed as shown in FIG. 10D.

The flat face valve 1050 includes a valve body 1051, an inlet port 1053, a valve armature 1052 and a valve actuator 1054. The valve body 1051 is mounted on the elongated bag 100 or filter 1000. The valve body 1051 can be mechanically or thermally bonded or otherwise mounted on and sealed to the elongated bag 100 or filter 1000.

Moving the actuator 1054 and armature in direction 1060A will open the flat face valve 1050 as shown in FIG. 10F. When the flat face valve 1050 is open, water 1057 can flow from the elongated bag 100 or filter 1000 through the inlet port 1053 and out through the outlet opening 1058.

The armature 1052 is sealed to the valve body 1051 such as with o-rings or a close tolerance, friction fit between the armature and the valve body. The armature 1052 can also include threads corresponding to the threads in the valve body 1051. By way of example, the threads in the armature and the valve body provide that rotating the armature in direction 1062A will move the armature 1052 laterally in direction 1060A to close the valve 1050. Similarly, rotating the armature 1052 in direction 1062B will move the armature laterally in direction 1060B to close the valve 1050.

The flat face 1055 on the exterior of the valve 1050 minimizes the surface area contaminated with untreated water that the inlet valve 1005 and filter 1000 may be exposed to when the elongated container 100 is filled with untreated or non-processed water.

The inlet valve 1005 can be normally-closed type valve, which would open only when the filter was attached. By way of example, the filter 1000 inlet may include a male or nipple structure that engages in a female coupling in the elongated container 100 such that inserting the male or nipple structure opens a membrane such as an iris or a reed type structure to the inner volume of the elongated bag. Similar type structures could also be used. Having a removable filter 1000 enables users to fill the elongated container 100 and perform the agitation and chemical treatment prior to attaching the filter. Thus exposing the filter 1000 to only treated water and not be contaminated by untreated water.

The filter envelope 1010 contains a suitable filter media as described above. The filter envelope 1010 can also include single or multiple layers or plies. The filter envelope 1010 can also include absorptive and or disinfection agents (e.g., Pur, as described above, activated charcoal, halogen disinfectant). The spacer 1012 includes a rigid or semi-rigid frame defining an inner filter volume 1012A. The spacer 1012 maintains the inner filter volume 1012A within the filter envelope 1010 to expose a greater area of the filter envelope to the water from the inlet, thus discouraging point flow concentrations of material captured in the filter 1010.

The filter envelope 1010 can have rectangular shape (as shown) or an elliptical shape (not shown) or any other shape having a major axis and a minor axis. The filter envelope 1010 has the major axis substantially aligned with the inlet 1004 and outlet 1006 so as to promote water flowing past and through more area of the filter envelope 1010.

The filter 1000 can optionally be mounted to the elongated container 100 in any suitable structure including, for example, a hook and loop connection, supported in a pocket of the elongated container, thermally bonded as part of the elongated container.

Figure 11A:
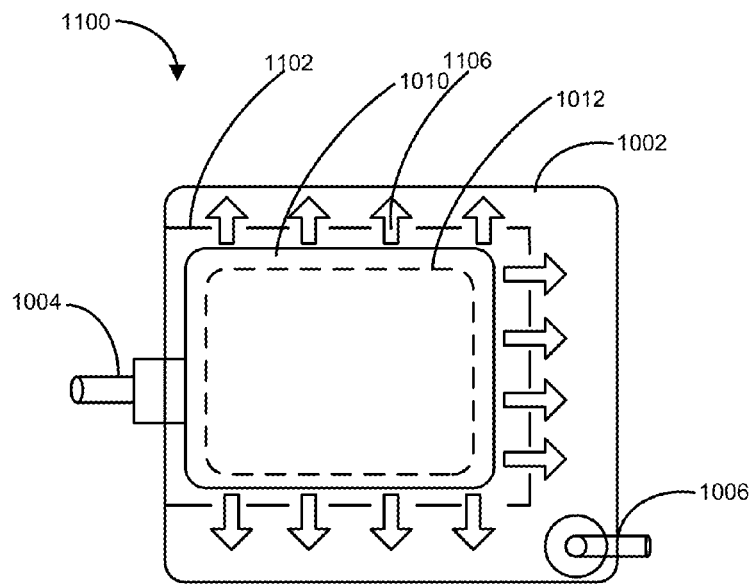
FIG. 11A is a simplified front view of a filter, in accordance with embodiments of the present invention.

FIG. 11A is a simplified front view of a filter 1100, in accordance with embodiments of the present invention. The filter 1100 includes a water tight enclosure 1002, an inlet 1004, an outlet 1006, a filter envelope 1010 and an optional spacer 1012. The filter 1100 also includes an intermittent barrier 1102 separating the filter envelope 1010 from an outer channel 1104. The openings 1106 in the intermittent barrier 1102 provide an indirect and distributed flow path from the inlet 1004, through the filter envelope 1010, through the openings 1106 into the outer channel 1104 and from the outer channel to the outlet 1006. The intermittent barrier 1102 thus promotes a distributed flow of the water to promote water flowing past and through more area of the filter envelope 1010. The intermittent barrier 1102 can be formed by one or more thermal welds similar to the construction of the elongated container 100.

Figure 11B:
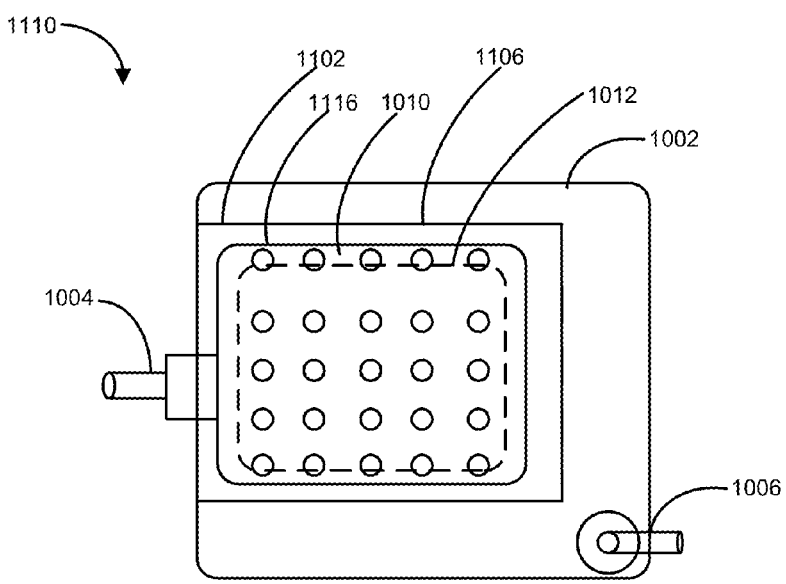
FIG. 11B is a simplified front view of a filter, in accordance with embodiments of the present invention.

FIG. 11B is a simplified front view of a filter 1110, in accordance with embodiments of the present invention. The filter 1110 includes a perforated barrier 1112. The perforated barrier 1112 distributes the water flow through the filter envelope 1010 from the inlet to the outer channel 1104 by allowing water to flow out of the filter envelope through multiple perforations 1116. The perforated barrier 1112 can be formed by a secondary water tight enclosure having multiple perforations 1116.

FIG. 12A is a simplified front view of an elongated enclosure 1200 incorporating a filter 1210, in accordance with embodiments of the present invention. FIG. 12B is a simplified front view of an elongated enclosure 1200 incorporating a two part filter 1210A, 1210B, in accordance with embodiments of the present invention. FIG. 12C is a more detailed view front view of the filter 1210, in accordance with embodiments of the present invention.

The filter 1210 includes a water tight enclosure 1202, an inlet 1204 and a flow distribution channel 1204A. The flow distribution channel 1204A is separated from a filter envelope 1010 by an intermittent barrier 1212. The intermittent barrier 1212 distributes the water flow through the openings 1216 as described above in FIGS. 11A and 11B above. The filter 1210 also includes an outlet 1206 coupled to the water tight enclosure 1202 substantially opposite from the intermittent barrier 1212 and the openings 1216.

The inlet 1204 is formed above a portion bottom 1201 of the elongated enclosure 1200. The slanted edge 1211, 1211A, 1211B of the filter 1210, 1210A, 1210B defines a bottom portion 1201 of the elongated enclosure 1200 where flocs will collect from the water being processed in the elongated enclosure. The inlet 1204 can also include a floc barrier 1220 to block flocs from settling out of the water and falling directly into the inlet 1204.

The filter 1210 can be formed by thermal welding similar to the formation of the elongated container 100, 1200, as described above. The intermittent barrier 1212, the slanted edge 1211, 1211A, 1211B and the floc barrier 1220 can be formed by thermal welding as the elongated container 1200 is formed.

Water flow into and through the filter 1210 can be controlled by folding the filter along the slanted edge 1211, 1211A, 1211B, thus crimping the inlet 1204 closed. A filter inlet device 1226A can be included to control water flow into the filter 1210. The filter inlet device 1226A can be a segment of zipper-like resealable seal (e.g., Ziploc™). Water flow through and out of the filter 1210 can be controlled by a filter outlet device 1226B. The filter outlet device 1226B can be a fold or a rolled portion of outlet tubing or a clipped portion of outlet tubing, an outlet valve or a segment of zipper-like resealable seal or any other suitable flow control device.

FIG. 12D is a simplified view front view of the filter 1250, in accordance with embodiments of the present invention. The filter 1250 includes a serpentine water flow path shown as the arrows 1240 and formed by alternating weld pattern 1231, 1232, 1233, 1234, 1235, 1236, 1237. A desired quantity of filter media is disposed within at least a portion of the serpentine water flow path 1240. The filter 1210, 1210A, 1210B of FIGS. 12A-12C can include a filter 1250 as described in FIG. 12D. It should be understood that while the serpentine filter 1250 is shown formed in a corner of the elongated container 100, the serpentine filter could be in an entirely separate water tight enclosure coupled to the outlet of the elongated container. Further, while the serpentine filter 1250 is shown formed in a substantially triangular shape, it should be understood that the serpentine filter can be formed in other shapes (e.g., round, rectangular, linear, etc.).

Figure 13A:
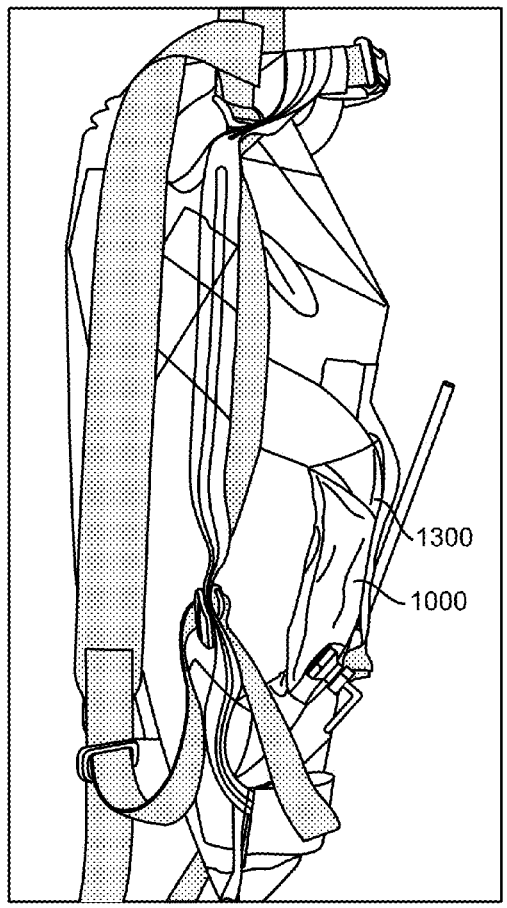
FIG. 13A is a side view of an external filter, mounted in a pocket on the elongated container, in accordance with embodiments of the present invention.
Figure 13B:
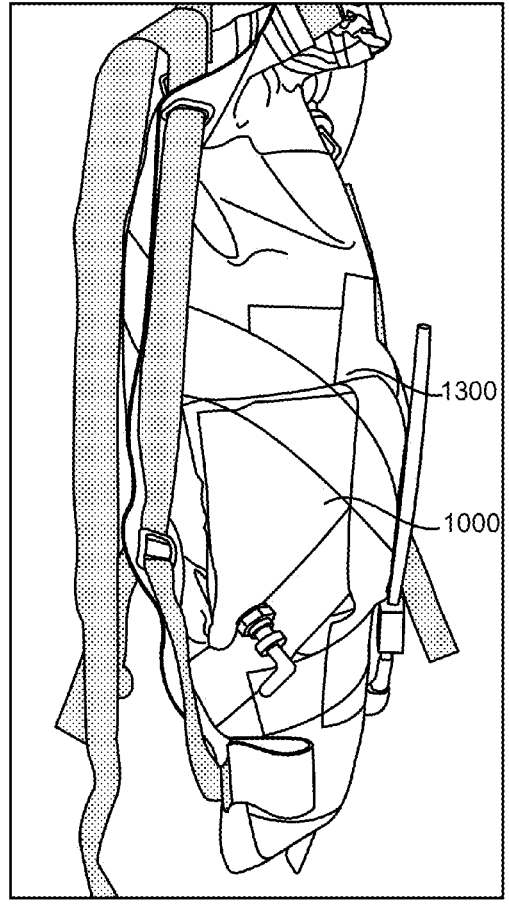
FIG. 13B is a front view of an external filter, mounted in a pocket on the elongated container, in accordance with embodiments of the present invention.

FIG. 13A is a side view of an external filter 1000, mounted in a pocket 1300 on the elongated container 100, in accordance with embodiments of the present invention. FIG. 13B is a front view of an external filter 1000, mounted in a pocket 1300 on the elongated container 100, in accordance with embodiments of the present invention. The external pocket 1300 secures the external filter 1000 to the elongated container 100. The external filter 1000 can also be replaceable as it is external from the elongated container 100.

FIG. 14A is a side sectional view of an external filter 1000 removably coupled to the elongated container 100, in accordance with embodiments of the present invention. The external filter 1000 is removably coupled to the elongated container 100 by a nipple inlet male fitting 1402 (e.g., a hose barb) that can be fitted into a female outlet tube, outlet hose or coupling 1404. The external filter 1000 can also include a filter outlet tube or coupling 1405. The female outlet coupling 1404 or hose can be a tube or formed by thermal welding similar to the manufacturing of the elongated container 100.

Alternatively, the female coupling 1404 can be formed by a plastic or metal fitting sealed to the elongated container 100 by any suitable means (e.g., thermally bonded, glued, mechanical compression fitting or other structure). The nipple inlet male fitting 1402 can fit inside the outlet tube 1404, 1912 to form a water-tight seal with the outlet tube.

An optional raised ridge 1402A of the nipple inlet male fitting 1402 has an outer diameter larger than an inside diameter of the outlet tube 1404. Thus inserting the nipple inlet male fitting into the outlet tube forms a water-tight seal between the nipple inlet male fitting 1402 and the inner surface 1404A of the outlet tube.

An optional outlet cap 1407 can be used to close the outlet tube 1404, 1912 when the filter 1000 is not coupled to the outlet tube. The outlet cap 1407 can include a nipple inlet male fitting 1412 (e.g., a hose barb) that can be fitted into the outlet tube 1404. A raised ridge 1412A of the nipple inlet male fitting 1412 has an outer diameter larger than an inside diameter of the outlet tube 1404 and thus inserting the nipple inlet male fitting into the outlet tube forms a water-tight seal between the nipple inlet male fitting 1412 and the inner surface 1404A of the outlet tube.

The outlet cap 1407 can optionally include an outer cover 1412. The outer cover 1412 can form a water-tight seal between the outer cover and the exterior surface 1404B of the outlet tube 1404. The outer cover 1412 can protect the exterior surface 1404B of the outlet tube 1404 from exposure to contaminants and untreated water when the filter 1000 is not coupled to the outlet tube.

The outer cover 1414 can optionally include a seal 1416 to seal the outer cover to the 1412 exterior surface 1404B of the outlet tube 1404. The seal 1416 can be any suitable seal such as a raised ridge inverted but substantially similar to the raised ridge 1412A of the nipple inlet male fitting 1412. The seal 1416 can have an inner diameter equal to or slightly smaller than an outside diameter of the outlet tube 1404. The seal 1416 can be formed by the outer cover 1412 having an inner diameter equal to or slightly smaller than an outside diameter of the outlet tube 1404. The outer cover 1412 can have a length 1415 sufficient to protect a desired length of the outlet tube 1404.

Removing the external filter 1000 during filling the elongated container 100 can prevent untreated water from contaminating the filter. A plug 1407 or other closure means (e.g., valve, clamp, fold, etc.) can be used to close the female coupling 1404 when the external filter 1000 is not coupled to the elongated container 100. The female coupling 1404 can also include an optional floc screen 1410 to prevent flocs from flowing into the external filter 1000.

FIG. 14B is a side view of an external filter 1000 coupled to the elongated container 100, in accordance with embodiments of the present invention. The external filter 1000 is coupled to the elongated container 100 by a flanged inlet fitting 1412. FIG. 14C is a detailed view of the flanged inlet fitting 1412, in accordance with embodiments of the present invention.

The flanged inlet fitting 1412 defines an inlet channel 1414 fluidly coupling the elongated container 100 to the external filter 1000. The flanged inlet fitting 1412 includes a first flange 1420A and a second flange 1420B. The first flange 1420A and second flange 1420B have respective outer diameters 1422A, 1422B, greater than an outer diameter 1424 of inlet channel 1414.

The first flange 1420A is coupled to the elongated container 100. The first flange 1420A can be coupled to the elongated container 100 by any suitable means (e.g., thermal welding, sealant, adhesive, mechanical compression). The first flange 1420A can be coupled to the elongated container 100 by stretching a hole 1426 in the elongated container having a diameter less than the outer diameter 1424 of inlet channel 1414 so that the hole 1426 will contract and seal to the outer diameter 1424.

The second flange 1420B is coupled to the external filter 1000. The second flange 1420B can be coupled to the external filter 1000 in a similar method and structure as the first flange 1420A is coupled to the elongated container 100.

Figure 15:
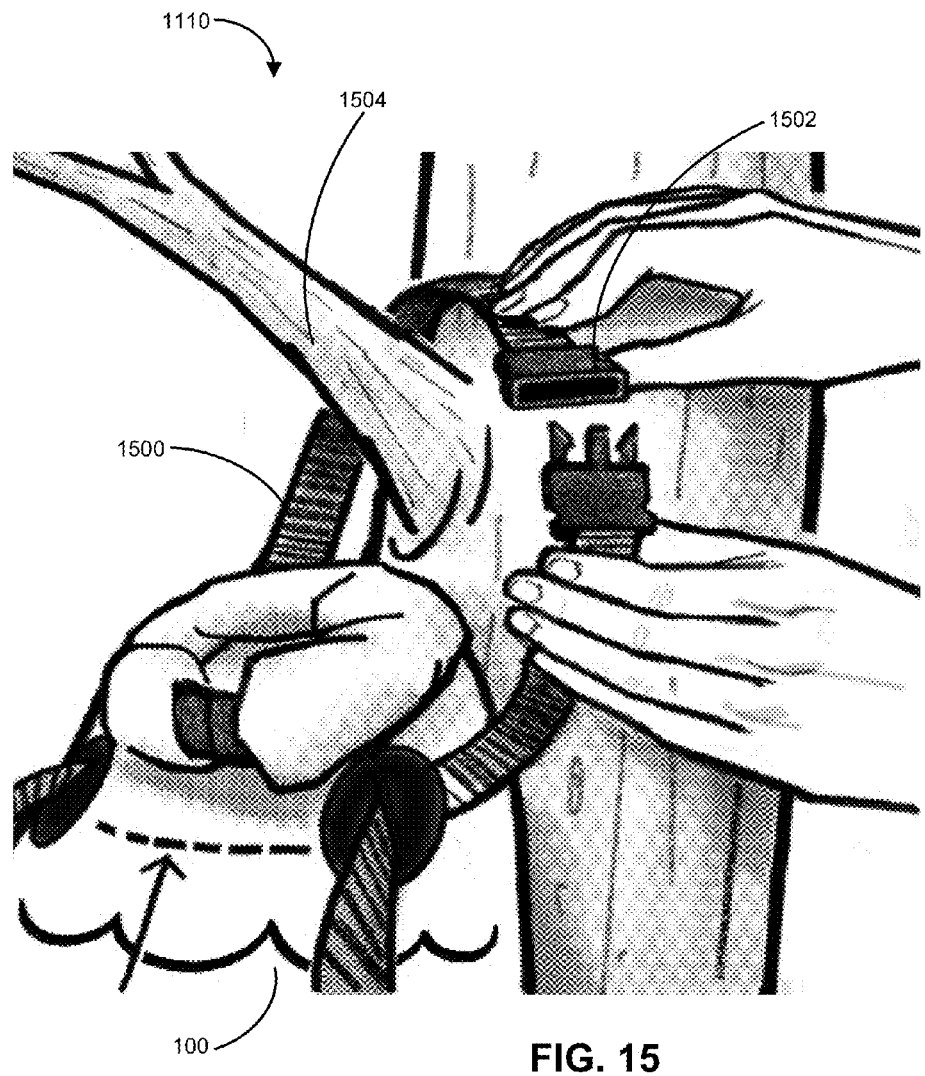
FIG. 15 is a simplified view of a strap on the elongated container, in accordance with embodiments of the present invention.

FIG. 15 is a simplified view of a strap 1500 on the elongated container 100, in accordance with embodiments of the present invention. The strap 1500 is similar to the strap 120 described above for carrying and supporting the elongated container 100, especially while hanging the elongated container vertically to allow the flocs to settle as part of the water treatment process. The strap 1500 includes a buckle 1502 or hook or other closure device (e.g., hook and loop fastener, button, hook and eye, etc.) to more easily allow the strap to be unbuckled and the strap extended over a suitable support 1504 (e.g., a tree limb, or similar) and then close the buckle 1502 to secure the strap over the support and thus supporting the elongated container in a vertical orientation to allow the flocs to settle.

Figure 16A:
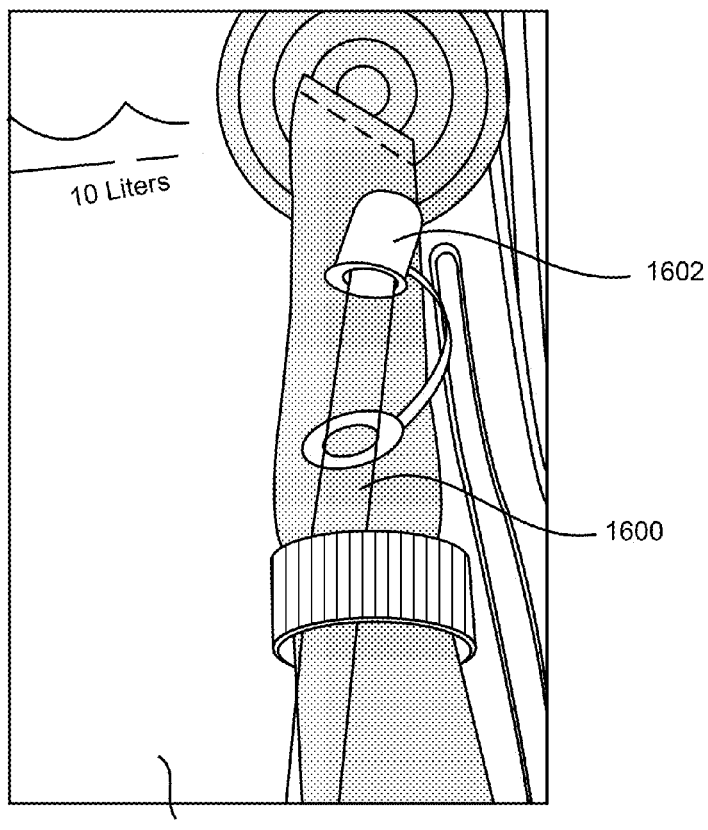
FIG. 16A is a simplified view of an outlet tube on the elongated container, in accordance with embodiments of the present invention.
Figure 16B:
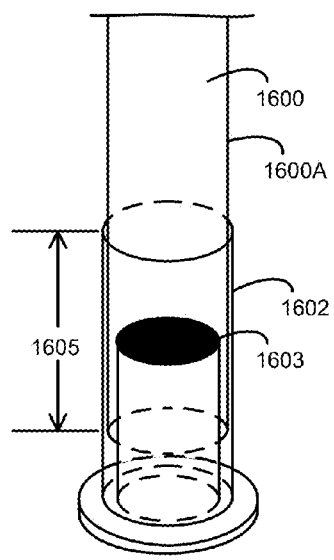
FIG. 16B is a simplified view of a cap on the outlet tube, in accordance with embodiments of the present invention.

FIG. 16A is a simplified view of an outlet tube 1600 on the elongated container 100, in accordance with embodiments of the present invention. FIG. 16B is a simplified view of a cap 1602 on the outlet tube 1600, in accordance with embodiments of the present invention. The outlet tube 1600 includes a cap 1602 to protect the outlet tube during filling the elongated container 100 or during transport or any other time water is not being drawn from the elongated container. The cap 1602 has a length 1605 sufficient to protect a desired length of the exterior surface 1600A of the outlet tube 1600. By way of example, the desired length of the exterior surface 1600A of the outlet tube 1600 may be between about 1 cm and about 10 cm such that the portion of the exterior surface of the outlet tube that a user might place in his mouth would be protected.

The cap 1602 can be substantially similar to the outlet cap 1407 described in FIG. 14A above. The cap 1602 can be substantially simpler than the outlet cap 1407 in that the inner male fitting 1603 can be included or may be optional. The inner male fitting 1603 can be substantially simpler than the outlet cap 1407 in that the inner male fitting may omit the raised ridge 1412A of the nipple inlet male fitting 1412.

Figure 17:
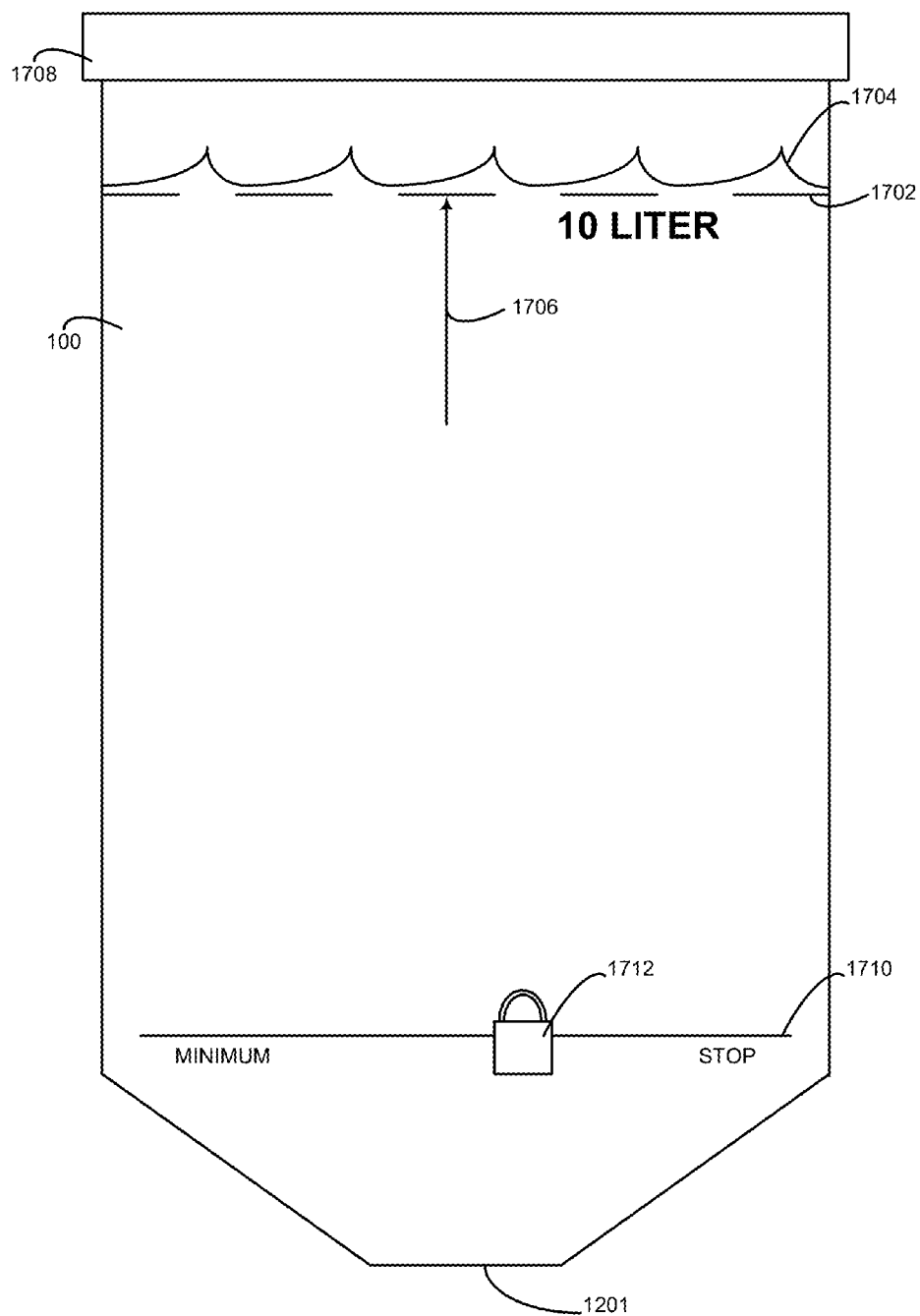
FIG. 17 illustrates instructional graphics, in accordance with embodiments of the present invention.

FIG. 17 illustrates instructional graphics 1700, in accordance with embodiments of the present invention. The elongated container 100 includes a closure 1708 as described above. The elongated container 100 can include a fill level line 1702 and a water line 1704. A "10 LITER" marking can also be included to indicate the quantity of water in the elongated container 100 when filled to the fill level line 1702.

The elongated container 100 can also include a minimum level line 1710 with an image of a padlock 1712. Recall, as described above, the flocs settle to and collect at the bottom 1201 of the elongated container 100. The minimum level line 1710 is important for a user to observe to avoid sending any flocs into the outlet of the elongated container 100.

Figure 18:
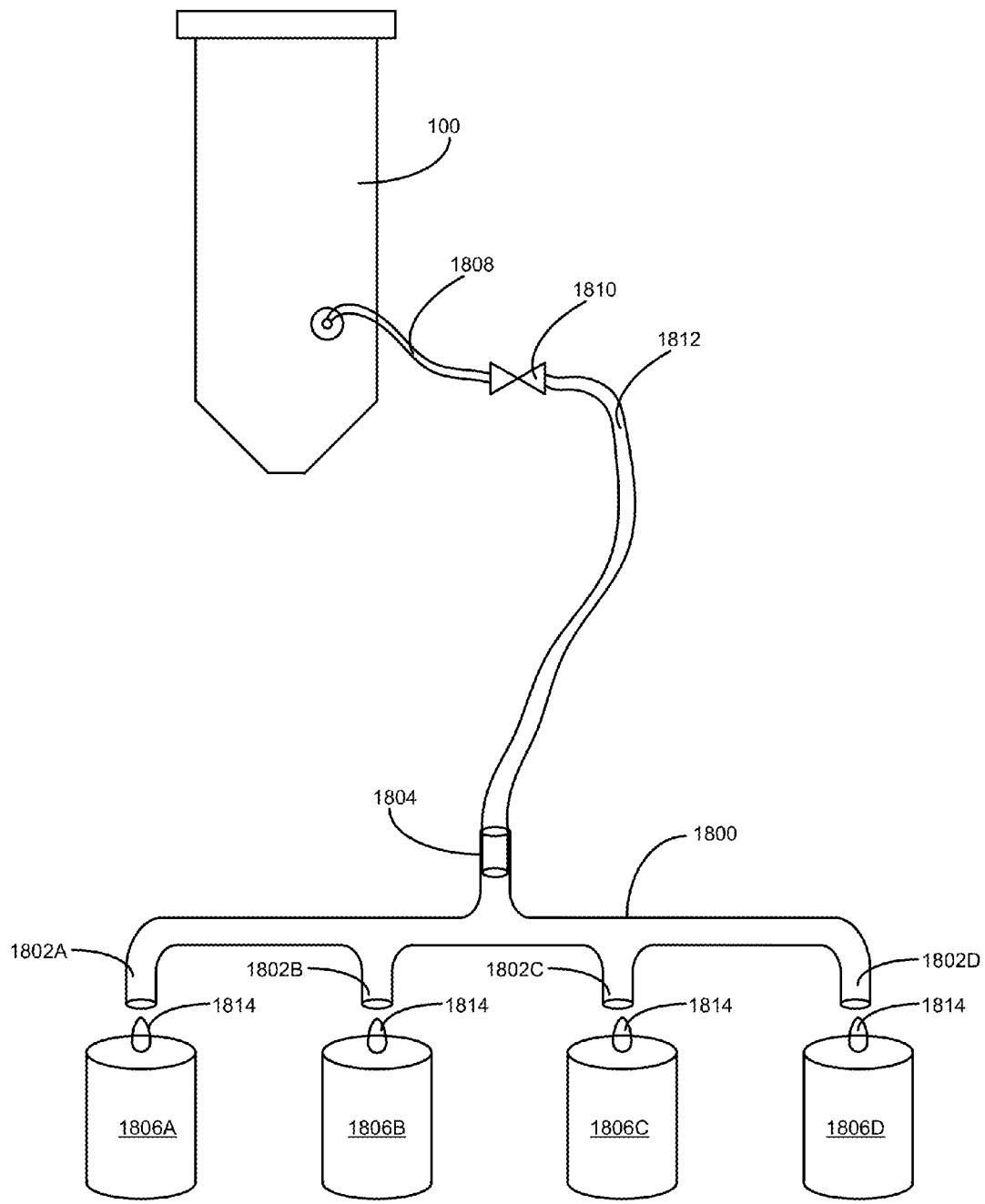
FIG. 18 is a simplified schematic of a distribution manifold, in accordance with embodiments of the present invention.

FIG. 18 is a simplified schematic of a distribution manifold 1800, in accordance with embodiments of the present invention. The distribution manifold 1800 includes one inlet 1804 and multiple outlets 1802A-D for distributing water 1814 to corresponding containers 1806A-D. The distribution manifold 1800 is shown having four outlets 1802A-D corresponding to four containers 1806A-D. It should be understood that the distribution manifold can have any number of outlets greater than or less than four. One or more of the multiple outlets 1802A-D can include a control valve (not shown).

An outlet tube 1808 is coupled to the elongated container 100. A valve 1810 can be a physical valve or a clipped, folded or rolled or combination thereof, segment of the outlet tube 1808 or any other flow control device as described herein. The supply tube 1812 couples the valve 1810 to the inlet 1804 of the distribution manifold 1800. The inlet 1804 forms a substantially water-tight connection to the supply tube 1812 distribution manifold 1800 similar to caps 1407 and 1602 as described above.

The distribution manifold 1800 can be formed in any suitable manner such as tubing and tee-type connectors. The distribution manifold 1800, outlet tube 1808, valve 1810 and supply tube 1812 can be formed from tubing and/or by bonding two or more layers of plastic material similar to the method of forming the elongated container 100, as described above.

Figure 19A:
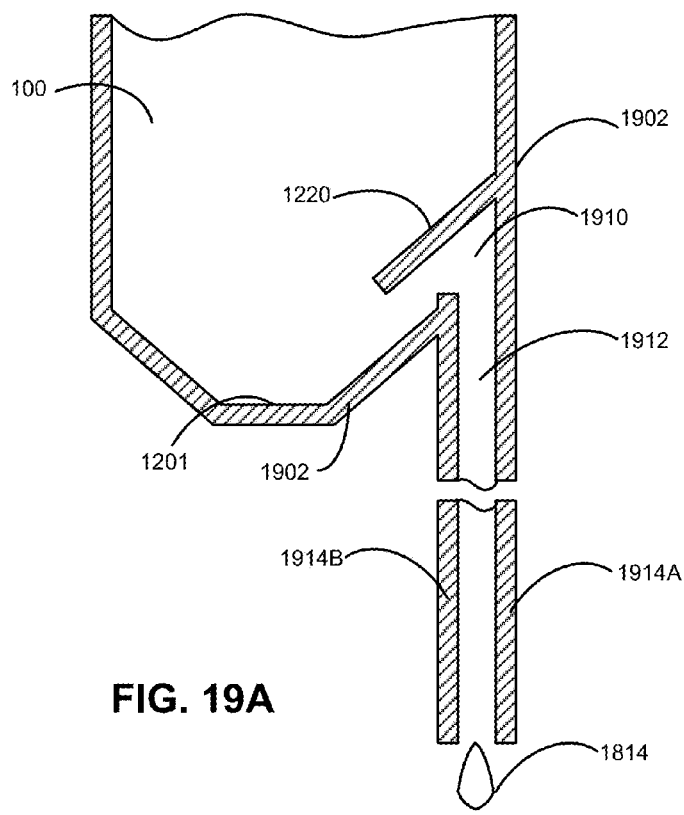
FIGS. 19A and 19B illustrate an outlet port of the elongated container, in accordance with embodiments of the present invention.
Figure 19B:
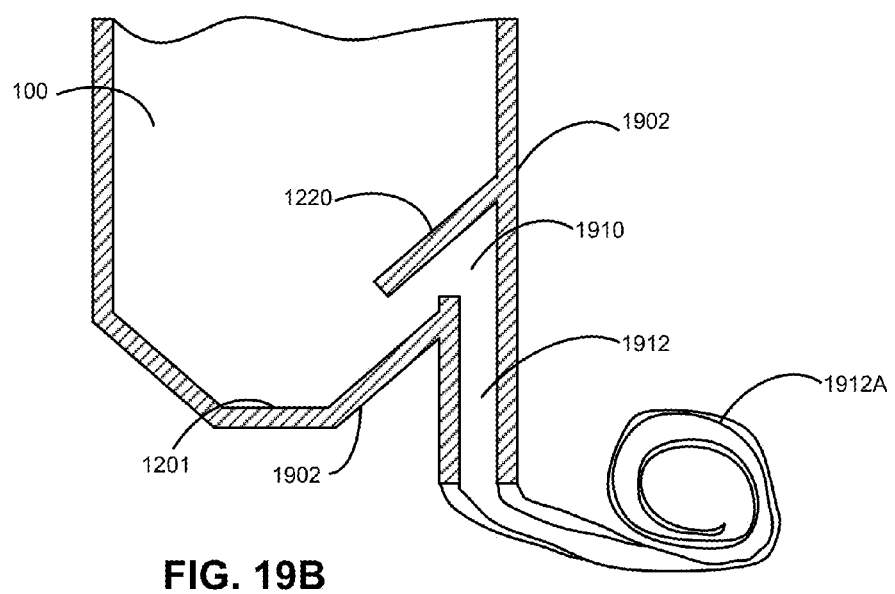

FIGS. 19A and 19B illustrate an outlet port 1910 of the elongated container 100, in accordance with embodiments of the present invention. The outlet port 1910 can be formed as an extension of the sheets of polymeric material forming the elongated material. The perimeter welds 1902 can be extended to create a tube 1912 formed between the two welds 1914A, 1914B. The tube 1912 can extend from the elongated container 100. The tube 1912 rolled 1912A, clamped, or tied to close the outlet port 1910 as shown in FIG. 19B. The outlet tube 1912 is shown formed with the elongated container 100, but it should be understood that the outlet tube 1912 can be formed separately from the container 100 and can be coupled to the outlet port of the elongated container.

Figure 20A:
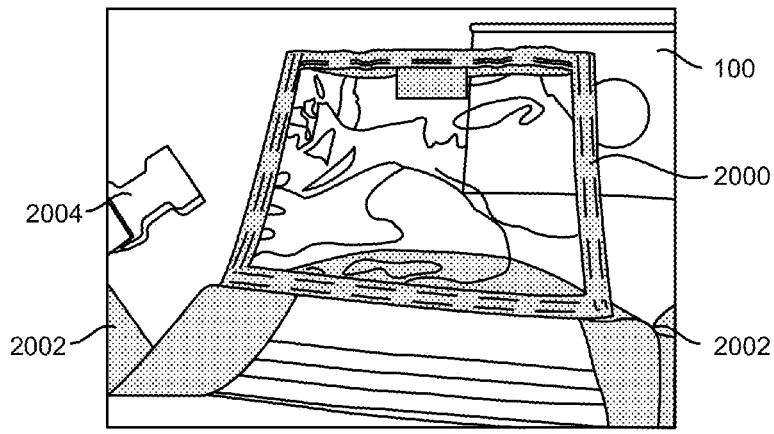
FIGS. 20A, 20B, 20C illustrate an accessory pouch, in accordance with embodiments of the present invention.
Figure 20B:
Figure 20C:
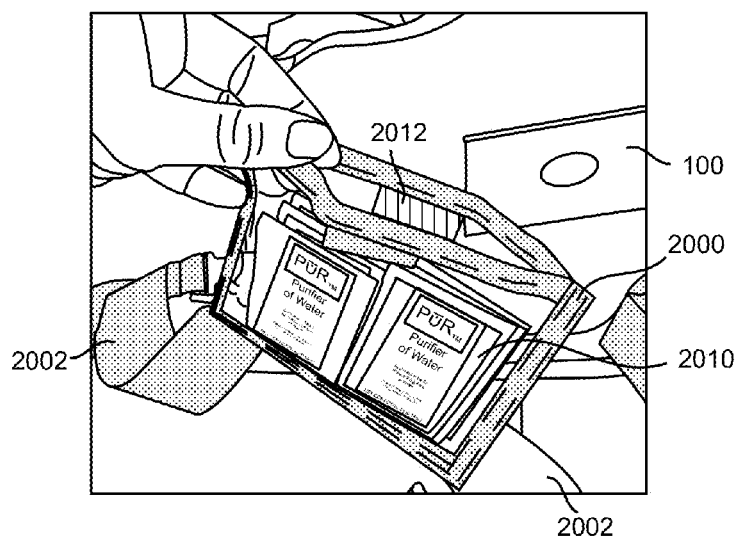

FIGS. 20A, 20B, 20C illustrate an accessory pouch 2000, in accordance with embodiments of the present invention. The accessory pouch 2000 includes straps 2002 and buckles 2004 for securing the accessory pouch to the elongated container 100. The accessory pouch 2000 can include adhesive or a hook and loop enclosure or other suitable attachment device for detachably attaching the accessory pouch to the elongated container 100. The accessory pouch 2000 can be used to store water purifier chemicals 2010, outlet tubing, distribution manifold or other accessories. The accessory pouch 2000 can include an enclosure 2012 such as a hook and loop enclosure, a zipper-like resealable seal (e.g., Ziploc™), straps, buttons, snaps, flaps or other suitable enclosures. The accessory pouch 2000 can be formed from materials similar to and in manufacturing methods similar to the elongated container 100 as described elsewhere herein. The accessory pouch 2000 can be substantially transparent as illustrated but is not required to be transparent.

Figure 21:
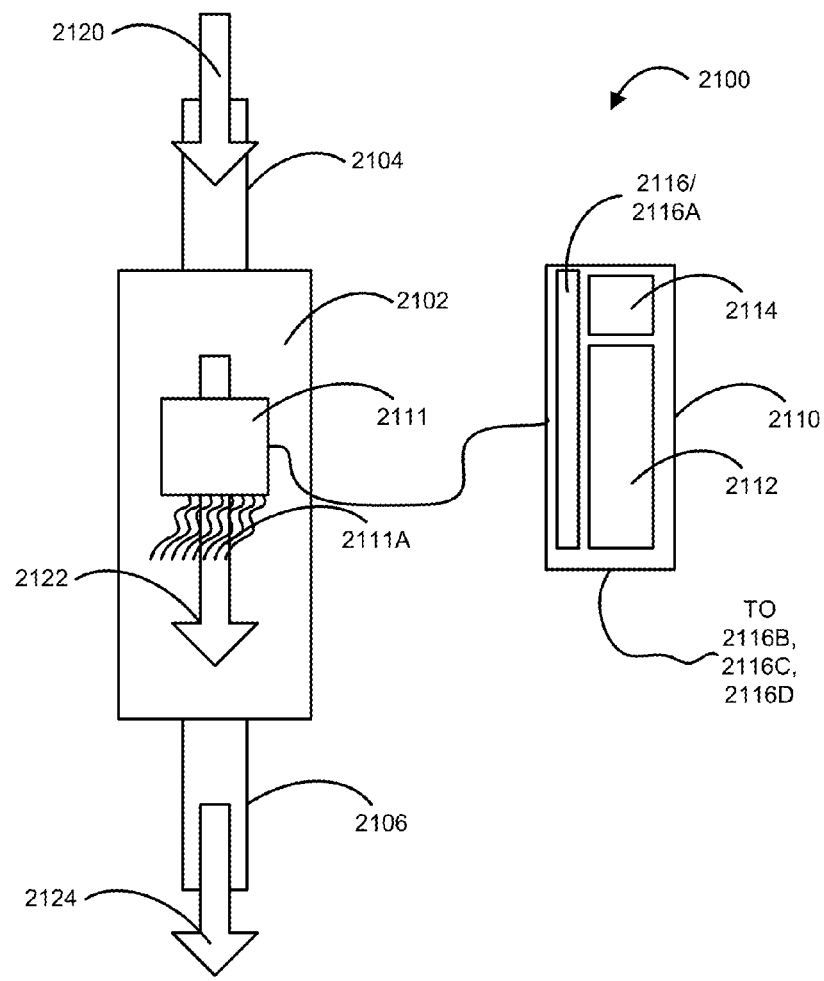
FIG. 21 is a simplified schematic of a portable, in-line ultraviolet water treatment device, in accordance with embodiments of the present invention.

FIG. 21 is a simplified schematic of a portable, in-line ultraviolet water treatment device 2100, in accordance with embodiments of the present invention. The in-line UV water treatment device 2100 includes a water enclosure 2102 having an inlet 2104 coupled to an outlet or outlet hose or tube of the elongated container 100 and an outlet 2106 for dispensing the treated water.

The in-line UV water treatment device 2100 also includes an electrical power source 2110 and a UV source 2112. The UV source can be any suitable UV emitting source including a light emitting diode, incandescent light, fluorescent light, or other suitable UV emitting source.

The electrical power source 2110 in electrically coupled to the UV source 2111 and can be mounted on the UV water enclosure 2102 or, optionally, separate from the water enclosure. The electrical power source 2110 can include a battery 2112 or other electrical power storage device. The electrical power source 2110 can include circuitry for managing electrical power output to the UV source 2111. The electrical power source 2110 can also include recharging circuitry 2114 for recharging the battery 2112. The recharging circuitry 2114 can also include one or more optional supplemental power sources 2116. The one or more optional supplemental power sources 2116 can be included in the electrical power source 2110 or can be separate from and electrically coupled to the electrical power source 2110. The optional supplemental power sources 2116 can include a photovoltaic source 2116A for gathering solar radiation to charge the battery. The supplemental power sources 2116 can also include a manual recharging source 2116B for the battery 2112 such as a hand powered generator. The supplemental power sources 2116 can also include inputs 2116C, 2116D for other alternating current and direct current power sources for recharging the battery 2112.

In operation, water 2120 flows into the inlet 2104 to be treated. The UV source 2111 emits UV radiation 2111A and as the water 2122 flows past the UV source, the UV radiation irradiates the water to sterilize and otherwise substantially kill any living organisms (e.g., bacteria, protozoa, etc.) present in the water. Treated water 2124 flows from the outlet 2106.

A field water purification system has been described in the foregoing disclosure. The field water purification system includes a container and a filter coupled to an outlet port of the container. The container includes a first layer and a second layer of polymeric material. A first edge of the first layer is bonded to a first edge of the second layer. A second edge of the first layer is bonded to a second edge of the second layer. A first end of the first layer is bonded to a first end of the second layer. The outlet port is disposed in the first layer at a first distance from the first end. The first end of the container can include a taper from at least one of the first side and the second side. The filter can include a nipple inlet fitting detachably coupling the filter to the outlet port. The outlet cap on the outlet tube can include a nipple inlet fitting. The outer cover of the cap can include an inner diameter equal to an outer diameter of an outlet tube, the outlet tube being coupled to the outlet port. The filter inlet can be coupled through the spacer to the inner filter volume. The intermittent barrier can include multiple bonded segments of the third layer and the fourth layer interspersed with multiple nonbonded segments of the third layer and the fourth layer, the nonbonded segments defining multiple openings in the intermittent barrier. The intermittent barrier can include a secondary water tight enclosure having multiple perforations.

The filter can be formed in at least one corner of the first end of the container. The filter can be a serpentine filter. The filter can include a zipper-like resealable seal on at least one of the filter inlet and the filter outlet. The container can include a zipper-like resealable seal on the outlet. The container can include at least one fold for closing the outlet port. The container can include at least hook and loop type fastener, clip or other suitable fastener to securing the at least one fold on the outlet port or any other portion of the container, outlet tube, bulkhead fitting, or the filter.

The field water purification system can also includes an outlet tube and a cap having a length sufficient to protect a desired length of an exterior surface of the outlet tube. The cap can include an inner male fitting.

The field water purification system can also include a distribution manifold including a manifold inlet and multiple manifold outlets. The field water purification system can also include an accessory pack.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A field water purification system comprising:
   a container including:
      a first layer and a second layer of polymeric material, a first edge of the first layer being bonded to a first edge of the second layer, a second edge of the first layer being bonded to a second edge of the second layer, a first end of the first layer being bonded to a first end of the second layer; and
      an outlet port disposed in the first layer, the outlet port disposed a first distance from the first end of the first layer; and
   a filter coupled to the outlet port, the filter including:
      a water tight enclosure being formed between a third layer of polymeric material and a fourth layer of polymeric material;
      a quantity of filter media disposed between the third layer and the fourth layer; and
      an outer channel having a first side formed by the water tight enclosure and a second side opposite from the first side, the second side including a plurality of bonded segments of a third layer and a fourth layer interspersed with a plurality of nonbonded segments of the third layer and the fourth layer, the nonbonded segments defining a plurality of openings in an intermittent barrier disposed between the outer channel and the filter media.

2. The field water purification system of claim 1, wherein the first layer and the second layer of polymeric material are included in a folded first single sheet of polymeric material and wherein the fold in the first single sheet of polymeric material includes the bond between the first edge of the first layer and the first edge of the second layer.

3. The field water purification system of claim 2, wherein the third layer and the fourth layer of polymeric material are included in a folded second single sheet of polymeric material and wherein the fold in the second single sheet of polymeric material includes the bond between the first edge of the third layer and the first edge of the fourth layer.

4. The field water purification system of claim 1, wherein the filter is detachably coupled to the outlet port.

5. The field water purification system of claim 1, wherein the outlet port includes an outlet tube extending from the outlet port and further comprising an outlet cap capable of capping the outlet port, the outlet cap includes an outer cover having a selected length and being capable of covering a corresponding selected length of the outlet tube.

6. The field water purification system of claim 1, wherein the filter is a flat filter including:
   a filter envelope including the filter media, the flat water filter having a minimal thickness when not filled with water.

7. The field water purification system of claim 6, wherein the filter further includes a spacer disposed within the filter envelope and defining an inner filter volume within the filter envelope.

8. The field water purification system of claim 1, wherein the water tight enclosure includes:
   a first edge of the third layer being bonded to a first edge of the fourth layer, a second edge of the third layer being bonded to a second edge of the fourth layer, a first end of the third layer being bonded to a first end of the fourth layer; a second end of the third layer being bonded to a second end of the fourth layer;
   a filter outlet disposed in at least one of the third layer and the fourth layer; and
   a filter inlet port disposed in at least one of the third layer and the fourth layer not including the filter outlet.

9. The field water purification system of claim 1, wherein the intermittent barrier further includes a secondary water tight enclosure having a plurality of perforations.

10. The field water purification system of claim 1, wherein the container includes an external pocket and wherein the filter is disposed within the external pocket.

11. The field water purification system of claim 1, further comprising a floc barrier proximate to the outlet port.

12. The field water purification system of claim 1, wherein the container includes thermally welded outlet tube coupled to the outlet port, the thermally welded outlet tube including a fifth layer and a sixth layer of polymeric material, a first edge of the fifth layer is bonded to the first edge of the sixth layer and a second edge of the fifth layer is bonded to the second edge of the sixth layer to define a tube between the first edge and the second edge of the bonded fifth layer and sixth layer, wherein the thermally welded outlet tube includes at least one of a group consisting of a folded portion and a rolled portion.

13. The field water purification system of claim 12, wherein the fifth layer is an extension of the first layer and the sixth layer is an extension of the second layer.

14. The field water purification system of claim 1, further comprising at least one strap, the at least one strap for supporting the container in a vertical orientation.

15. The field water purification system of claim 1, further comprising a graphic on at least one side of the container, the graphic including at least one of a fill line graphic and a minimum level line graphic.

16. The field water purification system of claim 1, wherein the filter includes an ultraviolet water treatment device.

17. The field water purification system of claim 1, wherein the container includes a plurality of straps capable of holding the container in a non-circular cross section, wherein each one of the plurality of straps has a first end coupled to the first layer and a second end coupled to the second layer.

18. A field water purification system comprising:
   a container including:
      a first layer and a second layer of polymeric material, a first edge of the first layer being bonded to a first edge of the second layer, a second edge of the first layer being bonded to a second edge of the second layer, a first end of the first layer being bonded to a first end of the second layer; and
      an outlet port disposed in the first layer, the outlet port disposed a first distance from the first end of the first layer; and
   a flat filter coupled to the outlet port, the filter including:
      a water tight enclosure being formed between a third layer of polymeric material and a fourth layer of polymeric material;
      a quantity of filter media disposed between the third layer and the fourth layer; and
      an outer channel having a first side formed by the water tight enclosure and a second side opposite from the first side, the second side including a plurality of bonded segments of a third layer and a fourth layer interspersed with a plurality of nonbonded segments of the third layer and the fourth layer, the nonbonded segments defining a plurality of openings in an intermittent barrier disposed between the outer channel and the filter media.

* * * * *